US011269702B1

(12) United States Patent
Cho

(10) Patent No.: US 11,269,702 B1
(45) Date of Patent: Mar. 8, 2022

(54) SYSTEMS AND METHODS FOR AUTOMATED APPLICATION PROGRAMMING INTERFACE EVALUATION AND MIGRATION

(71) Applicant: COUPANG CORP., Seoul (KR)

(72) Inventor: Nam Woong Cho, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/180,914

(22) Filed: Feb. 22, 2021

Related U.S. Application Data

(63) Continuation of application No. 17/003,380, filed on Aug. 26, 2020, now Pat. No. 10,956,244.

(51) Int. Cl.

| | |
|---|---|
| ***G06F 15/16*** | (2006.01) |
| ***G06F 9/54*** | (2006.01) |
| ***H04L 29/06*** | (2006.01) |
| ***H04L 67/133*** | (2022.01) |
| ***H04L 43/12*** | (2022.01) |

(Continued)

(52) U.S. Cl.
CPC ................ *G06F 9/547* (2013.01); *G06F 8/65* (2013.01); *G06F 9/541* (2013.01); *G06N 5/04* (2013.01); *H04L 43/12* (2013.01); *H04L 67/40* (2013.01)

(58) Field of Classification Search
CPC ............ G06F 9/541; G06F 8/65; G06F 9/547; G06N 5/04; H04L 43/12; H04L 67/40
USPC .......................................................... 709/217
See application file for complete search history.

(56) References Cited

U.S. PATENT DOCUMENTS 6,591,417 B1 * 7/2003 Strysniewicz ............ G06F 8/65 717/168
9,292,361 B1 3/2016 Chitilian et al.
9,300,759 B1 * 3/2016 Jorgensen ............... G06F 9/541
(Continued)

FOREIGN PATENT DOCUMENTS

JP 2019-101801 6/2019
WO WO 2018/00135 A1 11/2018
(Continued)

OTHER PUBLICATIONS

International Search Report and Written Opinion, dated May 24, 2021, for corresponding International Application No. PCT/IB2021/050636, filed Jan. 21, 2021. (9 pgs).
(Continued)

*Primary Examiner* — Hamza N Algibhah
(74) *Attorney, Agent, or Firm* — Finnegan, Henderson, Farabow, Garrett & Dunner LLP

(57) ABSTRACT

A computerized system for API migration. The system includes a memory storing instructions and a processor configured to execute the instructions to perform operations, which include segregating client accounts three groups, assigning a first API for communications with the first group and a second API for communications with the second group, and assigning the first API for communications with a first portion of the third group and the second API for communications with a second portion of the third group. The operations may also include collecting communications from the groups and generating metrics associated with each group, and generating a comparative report and a compatibility report. The operations may also include transmitting at least one of an alert or a recommendation based on the comparative report and the compatibility report.

20 Claims, 20 Drawing Sheets

(51) Int. Cl.
*G06F 8/65* (2018.01)
*G06N 5/04* (2006.01)

(56) References Cited

U.S. PATENT DOCUMENTS

| | | | | |
|---|---|---|---|---|
| 9,442,700 | B2 | 9/2016 | Sarid | |
| 9,898,273 | B1 * | 2/2018 | Dong | G06F 8/65 |
| 10,725,836 | B2 * | 7/2020 | Savenkov | G06F 16/367 |
| 10,956,242 | B1 * | 3/2021 | Kumar | G06F 16/951 |
| 2002/0180792 | A1 * | 12/2002 | Broussard | G06F 3/0481 715/764 |
| 2006/0143340 | A1 * | 6/2006 | Labar | G06F 16/258 710/62 |
| 2006/0190923 | A1 * | 8/2006 | Jubran | G06F 9/44589 717/104 |
| 2011/0067040 | A1 * | 3/2011 | Nagahara | G06F 11/3668 719/328 |
| 2011/0078674 | A1 * | 3/2011 | Ershov | G06F 11/3604 717/170 |
| 2011/0113405 | A1 * | 5/2011 | Guerrera | G06F 11/3419 717/125 |
| 2011/0314443 | A1 * | 12/2011 | Kurian | G06F 8/76 717/106 |
| 2014/0173566 | A1 | 6/2014 | Hsu et al. | |
| 2015/0022666 | A1 | 1/2015 | Kay et al. | |
| 2015/0128156 | A1 * | 5/2015 | Zhu | G06F 11/302 719/328 |
| 2016/0335168 | A1 * | 11/2016 | Freiberg | G06F 8/436 |
| 2017/0212737 | A1 * | 7/2017 | Wolfram | G06F 8/60 |
| 2017/0337052 | A1 | 11/2017 | Elkabany | |
| 2018/0107479 | A1 * | 4/2018 | Duppenthaler | G06F 8/71 |
| 2019/0079734 | A1 * | 3/2019 | Kadam | G06F 8/41 |
| 2019/0095318 | A1 * | 3/2019 | Bahrami | G06F 11/3676 |
| 2019/0095967 | A1 * | 3/2019 | Skulnik | G06Q 30/0601 |
| 2019/0179624 | A1 * | 6/2019 | Agarwal | G06F 11/36 |
| 2019/0259047 | A1 * | 8/2019 | Bharti | G06Q 30/0201 |
| 2019/0288915 | A1 * | 9/2019 | Denyer | G06F 9/54 |
| 2019/0317842 | A1 * | 10/2019 | Bharti | G06Q 30/0283 |
| 2019/0318079 | A1 * | 10/2019 | Sandoval | G06F 21/52 |
| 2019/0384650 | A1 * | 12/2019 | Danielsson | G06F 8/75 |
| 2020/0065160 | A1 * | 2/2020 | Park | G06N 20/00 |
| 2020/0097338 | A1 * | 3/2020 | Dhondse | G06N 3/082 |
| 2020/0159597 | A1 * | 5/2020 | Gino | G06F 9/541 |
| 2020/0301760 | A1 * | 9/2020 | Janakiraman | G06F 9/54 |
| 2021/0081260 | A1 * | 3/2021 | Gilling | G06F 9/30021 |
| 2021/0216443 | A1 * | 7/2021 | Park | G06F 16/907 |
| 2021/0233126 | A1 * | 7/2021 | Weerapurage | H04L 41/5051 |
| 2021/0248019 | A1 * | 8/2021 | Gilling | G06F 13/1668 |
| 2021/0271466 | A1 * | 9/2021 | Sridhara | G06F 8/65 |
| 2021/0303454 | A1 * | 9/2021 | Wang | G06F 11/3692 |

FOREIGN PATENT DOCUMENTS

| | | | | |
|---|---|---|---|---|
| WO | WO 2018/200135 | A1 | 11/2018 | |
| WO | WO-2018200135 | A1 * | 11/2018 | G06F 8/73 |

OTHER PUBLICATIONS

Vodă, I. (2014). Migrating Existing PHP Web Applications to the Cloud. Informatica Economica, 18(4).

Lolić, Teodora, et al. "Integration of Applications Using Oracle Soa and Mulesoft." The 8th PSU-UNS International Conference on Engineering and Technology (ICET-2017), Novi Sad, Serbia, Jun. 8-10, 2017 University of Novi Sad.

Alaasam, Ameer Ba, Gleb Radchenko, and Andrey Tchernykh. "Stateful Stream Processing for Digital Twins: Microservice-Based Kafka Stream DSL." 2019 International Multi-Conference on Engineering, Computer and Information Sciences (SIBIRCON). IEEE, 2019.

Bunch, Chris, et al. "An evaluation of distributed datastores using the AppScale cloud platform." 2010 IEEE 3rd International Conference on Cloud Computing. IEEE, 2010.

Gamage, T. (Oct. 21, 2018). Microservices Design Guide. Retrieved Aug. 26, 2020, from https://medium.com/platform-engineer/microservices-design-guide-eca0b799a7e8.

* cited by examiner

350

1100

1102 1104 1106 1108

| | API client | Assigned APIs | Methods | Test Scenarios |
|---|---|---|---|---|
| 1110 | Legacy Group | API 1 | GET, POST, PUT, . . . | Load, respond, write |
| 1112 | Update Group | API 2 | GET, POST, PUT, REST . . . | Load, respond, write |
| 1114 | Compatibility Group A | API 1 | GET, POST, PUT, . . . | Responds, write |
| 1116 | Compatibility Group B | API 2 | GET, POST, PUT, REST . . . | Responds, write |

FIG. 11

SYSTEMS AND METHODS FOR AUTOMATED APPLICATION PROGRAMMING INTERFACE EVALUATION AND MIGRATION

RELATED APPLICATIONS

This application is a continuation of U.S. patent application Ser. No. 17/003,380 (now allowed) filed on Aug. 26, 2020, which is hereby incorporated by reference in the present application in its entirety.

TECHNICAL FIELD

The present disclosure generally relates to computerized systems and methods for upgrading or migrating application programming interfaces (APIs) in a cloud environment. In particular, embodiments of the present disclosure relate to systems and methods for automated comparative evaluation of API performance using bucketed or split-run testing during an API modification, upgrading, or migration.

BACKGROUND

APIs are computing interfaces that allow communications between different technologies and applications to work together, regardless of language or platform, by defining methods for interaction. APIs specify a set of routines and protocols that enable communicating data, accessing information, and building applications. APIs are now crucial in the cloud computing environments as they have become the principal point of interaction between clients and data providers. In particular, APIs have allowed customers to access information from business systems as needed in a stable, organized, and secure way. Indeed, APIs have been very beneficial in the transition of businesses to cloud environments because they allow customized and secure interactions. For example, through APIs it is possible to communicate a server with external clients while managing security of business resources, and monitoring and analyzing interactions. Overall, using APIs cloud services can create communications bridges and develop an architecture that services different types of clients.

Once an API is deployed, the clients of systems use the API to access information and/or to communicate with the service provider. However, in some situations it may be desirable to modify, update, or upgrade the API. For example, the service provider may decide to modify functions or protocols in the API to improve how classes, functions, and properties work. These changes may be introduced to improve the efficiency of the communications (e.g., minimize network congestion) or to prevent errors. The transition or migration from one API to another, or between different versions of APIs, may create issues because client systems may not be able to adapt to the updated API or because the API behaves differently, causing delays or unexpected results. For instance, in the updated API some of the scripting commands that clients use may get modified or removed. These changes may cause compatibility errors during the API migration. And given the complexity of certain APIs and the convoluted interactions that may exist between clients and sever, it can be difficult to identify and correct incompatibilities.

The disclosed systems and methods for API migration address one or more of the problems set forth above and/or other problems in the prior art.

SUMMARY

One aspect of the present disclosure is directed to a computerized system for API migration. The system may include at least one memory storing instructions and at least one processor configured to execute the instructions to perform operations. The operations may include segregating client accounts into a first group, a second group, and a third group (each group having distinct members), assigning a first API for communications with the first group and a second API for communications with the second group, and assigning the first API for communications with a first portion of the third group and the second API for communications with a second portion of the third group. The operations may also include collecting (during a time interval) communications from the first group, the second group, and the third group, and generating metrics associated with each group. Further, the operations may also include generating a comparative report comparing the metrics associated with the first group and the metrics associated with the second group, and generating a compatibility report based on the metrics associated with the third group. In some embodiments, the operations may also include transmitting at least one of an alert or a recommendation based on the comparative report and the compatibility report.

Another aspect of the present disclosure is directed a computer-implemented method for API migration. The method may include segregating client accounts into a first group, a second group, and a third group (each group having distinct members), assigning a first API for communications with the first group and a second API for communications with the second group, and assigning the first API for communications with a first portion of the third group and the second API for communications with a second portion of the third group. The method may also include collecting (during a time interval) communications from the first group, the second group, and the third group, and generating metrics associated with each group. Further, the method may also include generating a comparative report comparing the metrics associated with the first group and the metrics associated with the second group, and generating a compatibility report based on the metrics associated with the third group. In some embodiments, the method may also include transmitting at least one of an alert or a recommendation based on the comparative report and the compatibility report.

Yet another aspect of the present disclosure is directed to a system including one or more processors and one or more memory devices storing instructions. When executed by the one or more processors, the instructions configure the one or more processors to segregate client accounts in a first group, a second group, and a third group (each group having distinct members), assign a first API for communications with the first group and a second API for communications with the second group (the first API being a legacy API and the second API being an updated API), where the first API and the second API include integration extensions connecting online shops with an e-commerce data center. The instructions may also configure the one or more processors to assign the first API for communications with a first portion of the third group and the second API for communications with a second portion of the third group, and to collect (during a time interval) communications from the first group, the second group, and the third group. The instructions may also configure the processors to generate API metrics associated with each group, generate a comparative report comparing the API metrics associated with the first group and the API metrics associated with the second group (the comparative report comprising a difference between the API metrics associated with the first group and the API metrics associated with the second group), and generate a compatibility report based on the API metrics associated with the third group. Further, the instructions may also configure the processors to determine whether the difference is below a viability threshold, determine whether the API metrics associated with the third group are below a compatibility threshold, and in response to determining the difference is below the viability threshold and the API metrics associated with the third group are above the compatibility threshold, transmit a recommendation comprising an updated API map table and a migration API plugin.

BRIEF DESCRIPTION OF THE DRAWINGS

FIG. 11 is an exemplary API map table for split-run testing, consistent with disclosed embodiments.

DETAILED DESCRIPTION

Figure 1A:
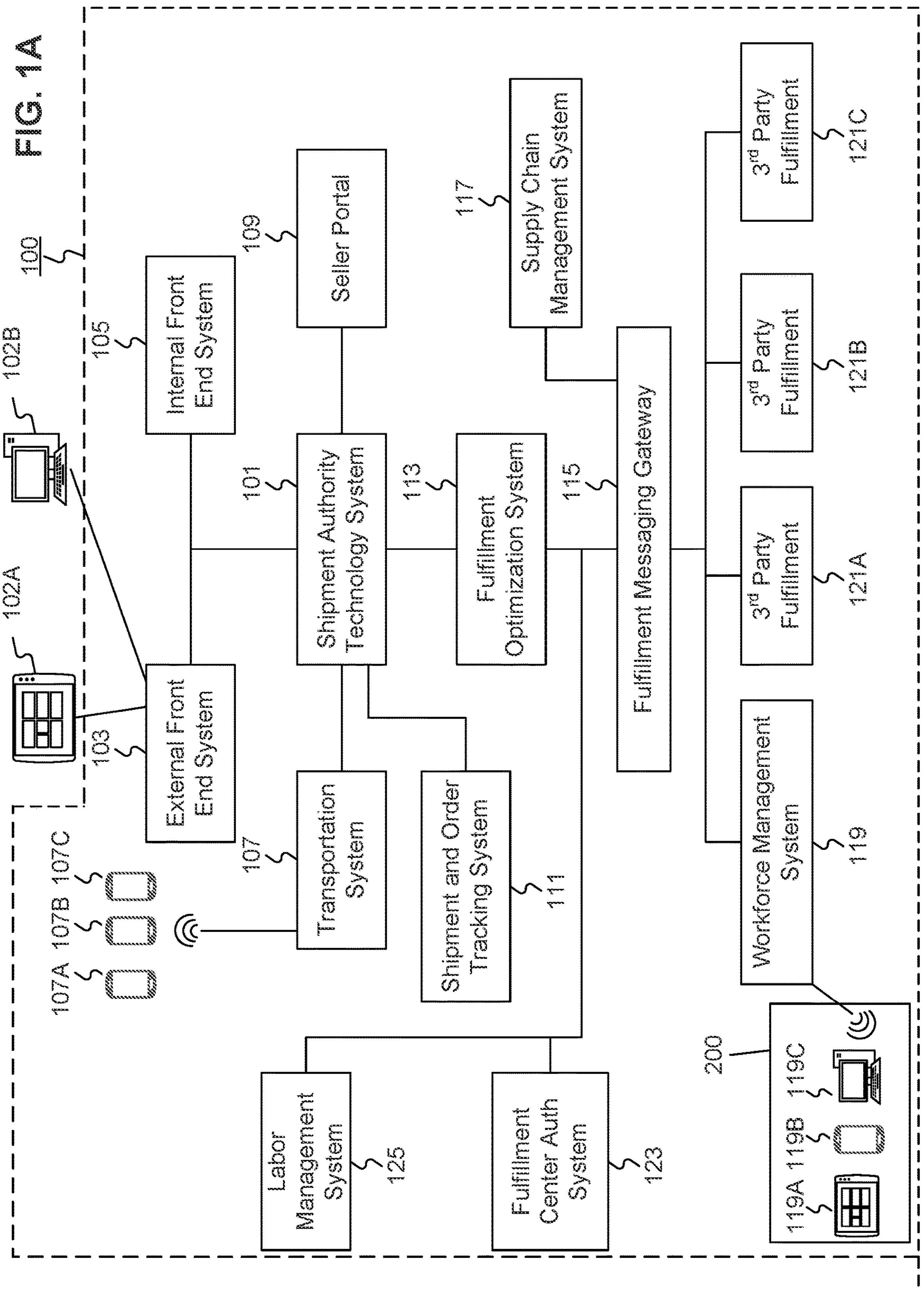
FIG. 1A is a schematic block diagram illustrating an exemplary embodiment of a network comprising computerized systems for communications enabling shipping, transportation, and logistics operations, consistent with the disclosed embodiments.
Figure 1B:
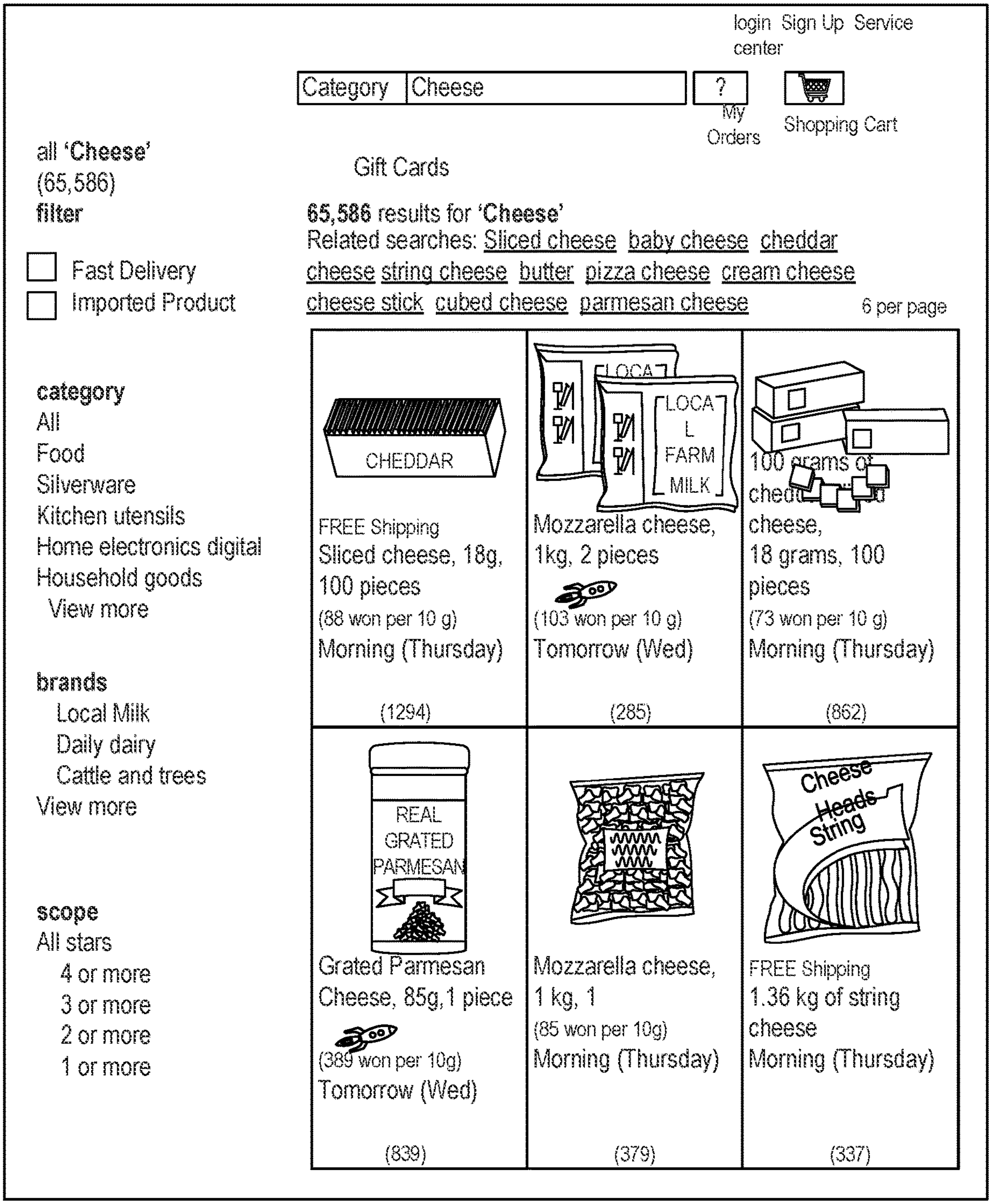
FIG. 1B depicts a sample Search Result Page (SRP) that includes one or more search results satisfying a search request along with interactive user interface elements, consistent with the disclosed embodiments.
Figure 1C:
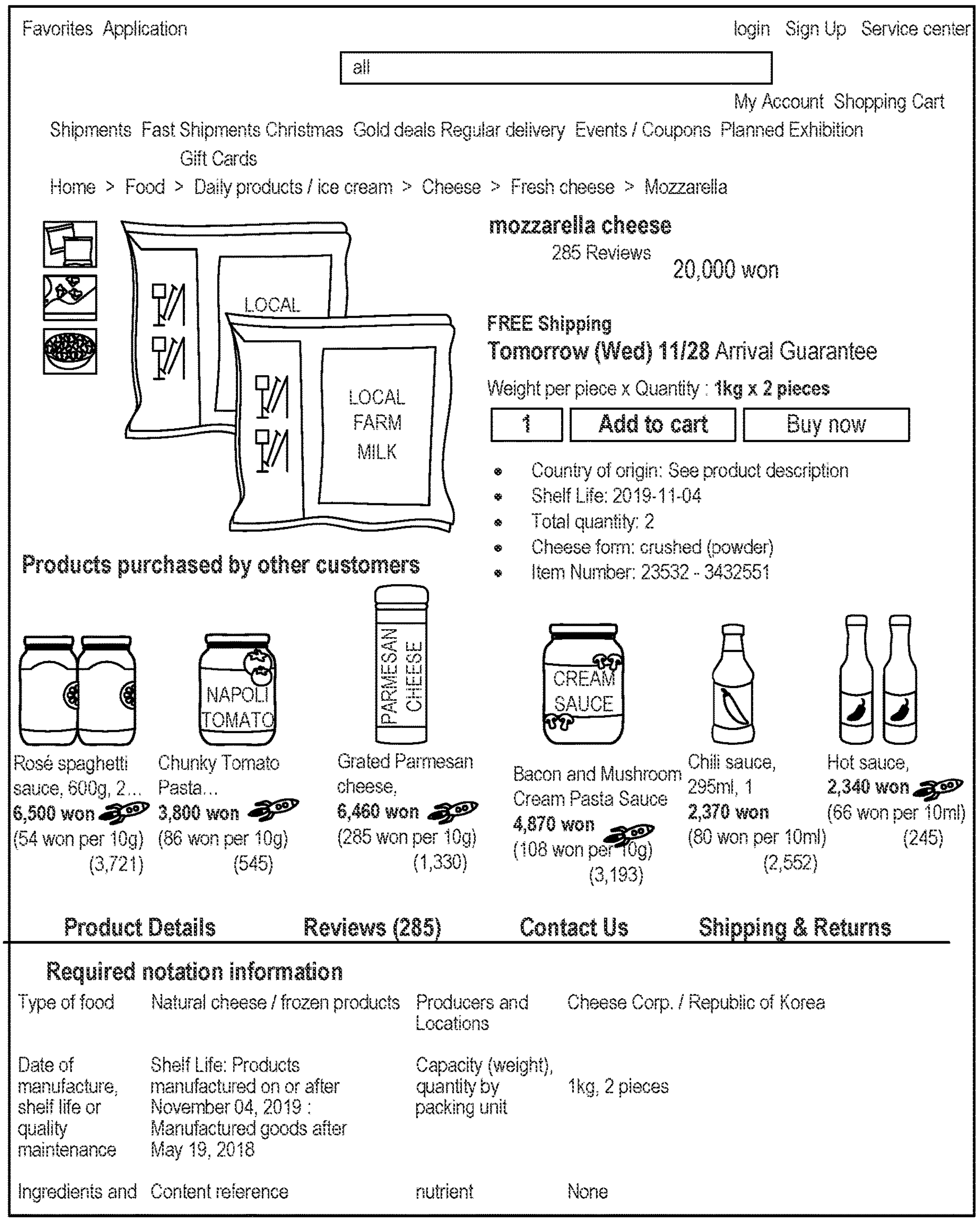
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for facilitating and/or automating an API migration, which may include modification, upgrade, and/or update of APIs. In particular, the disclosed systems and methods may provide tools to perform bucketed or split-run testing of multiple APIs to evaluate their performance and identify problems and/or incompatibilities during migrations. In some embodiments, the disclosed systems and methods may improve the technical field of website maintenance and updating by providing tools for automated verification or translation of functions between different API systems. For example, the disclosed systems and methods may improve website debugging during API migration by providing tools to perform automated comparative API testing. Additionally, the disclosed systems and methods may improve the field of website maintenance by automating upkeep of API mapping tables and flow paths.

Moreover, the disclosed systems and methods may improve the technical field of website debugging by providing tools for automated bucket or split-run testing of APIs. Such tools may identify API incompatibility and poor performance with comparative analyses, and automatically reconfigure API systems and/or generate notifications. For example, disclosed systems and methods may be configured to detect uses of obsolete code or legacy code in API scripts, propose modifications, and/or automatically update them. Moreover, disclosed systems and methods may facilitate API version control by generating comparative reports pointing to difficulties. Moreover, in addition to evaluating incompatibility issues, the disclosed systems and methods may allow quantitative performance evaluation by generating comparative metrics based on API performance.

Moreover, the disclosed system and methods may improve network monitoring operations by using API functions to trigger monitoring functions. For example, in some embodiments of the present disclosure, a system may monitor only portions of the network communication that involves API functions or routines. For example, the disclosed systems and methods may improve network management during API transitions by programing, as part of the API, certain functions that initiate and stop packet capture in data collection tools to filter the interactions that are of interest and facilitate analysis of the API performance.

Reference will now be made in detail to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Display Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. In some embodiments, the SRP may also include delivery options, cutoff times for delivery options and/or hypermedia elements requesting user input. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, cutoff time for dawn or first time deliveries, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Display Page) (e.g., FIG. 1C) based on the received product information, location of the customer device, and availability of delivery options. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. Alternatively, or additionally, the user may interact with the SDP by providing instructions for delivery. The user device may transmit this request to add the product to the shopping cart to external front-end system 103.

Figure 1D:
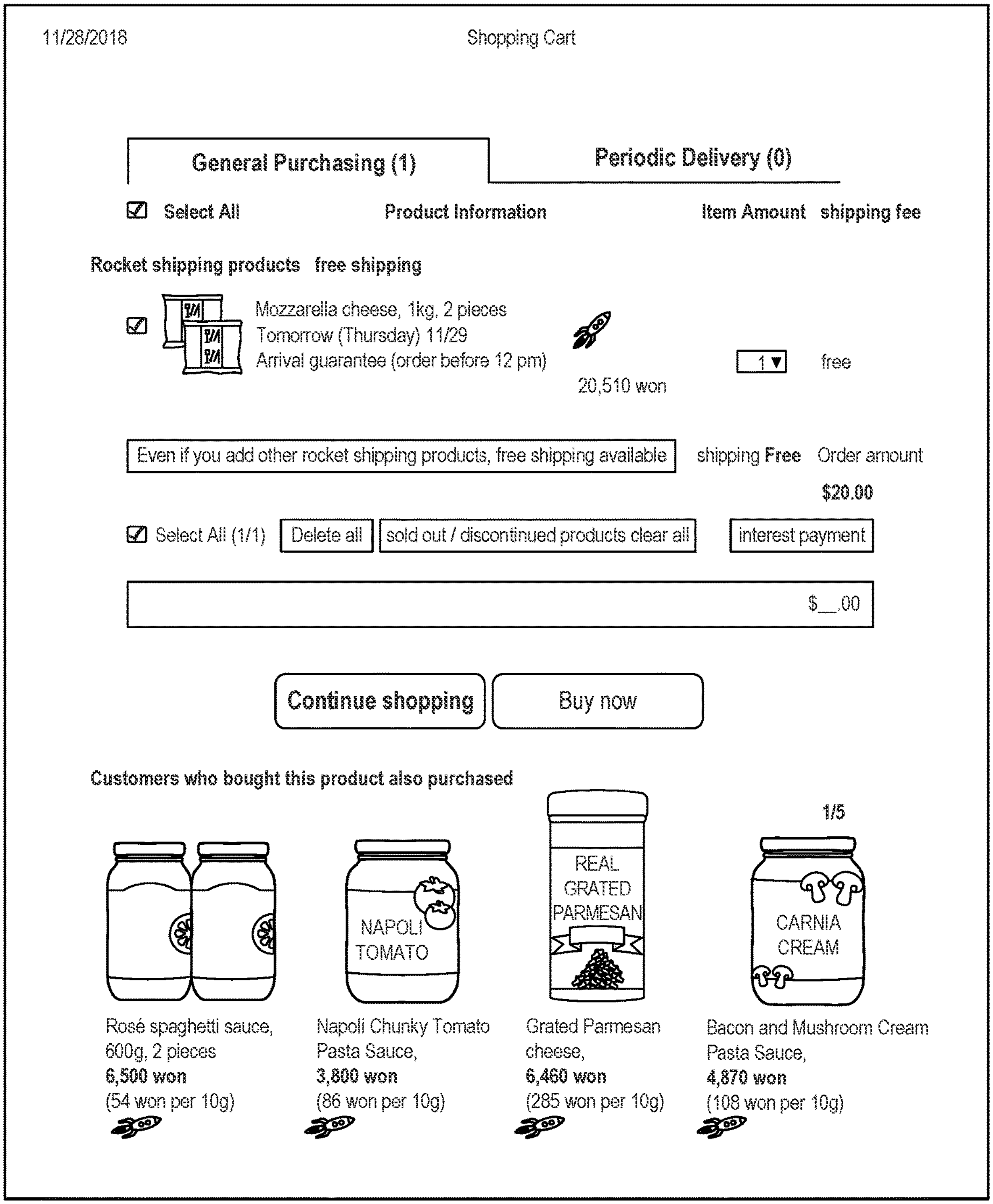
FIG. 1D depicts a sample cart page that includes items in a virtual shopping cart along with interactive user interface elements, consistent with the disclosed embodiments.
Figure 1E:
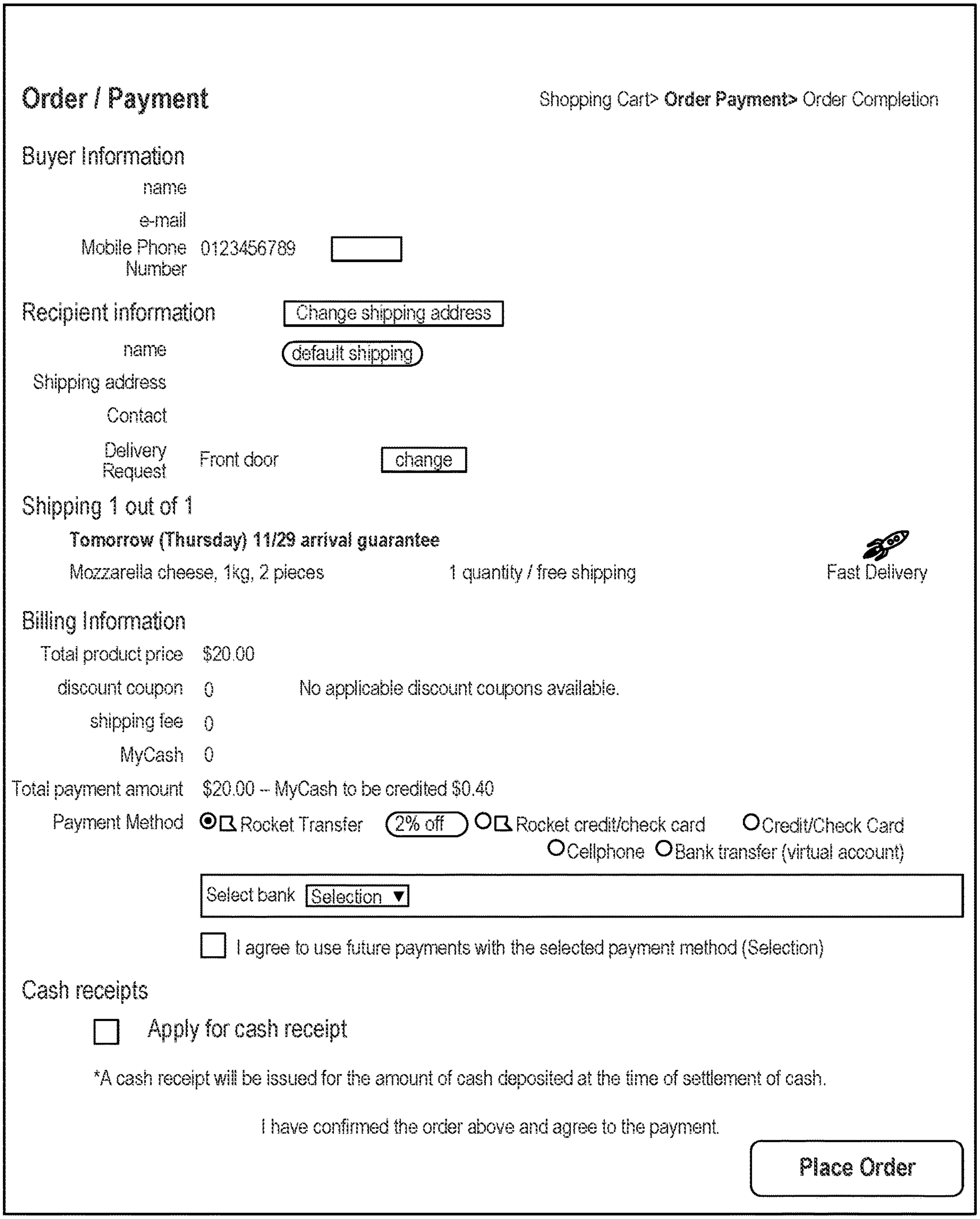
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103. In some embodiments, the Cart page may include text box inputs, interactive icons, or recommendation messages for each product delivery.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart. In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below regarding FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
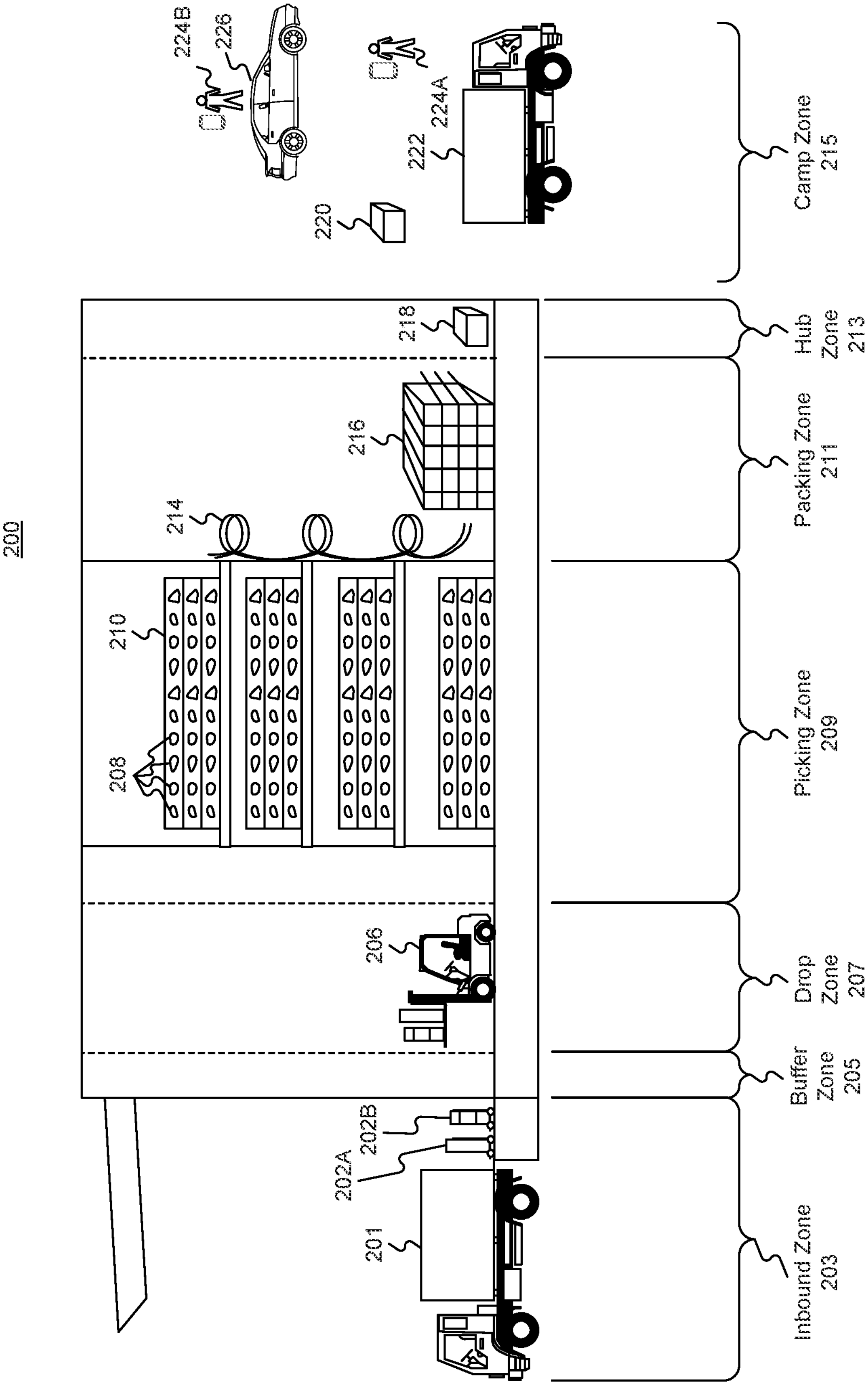
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones or locations, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
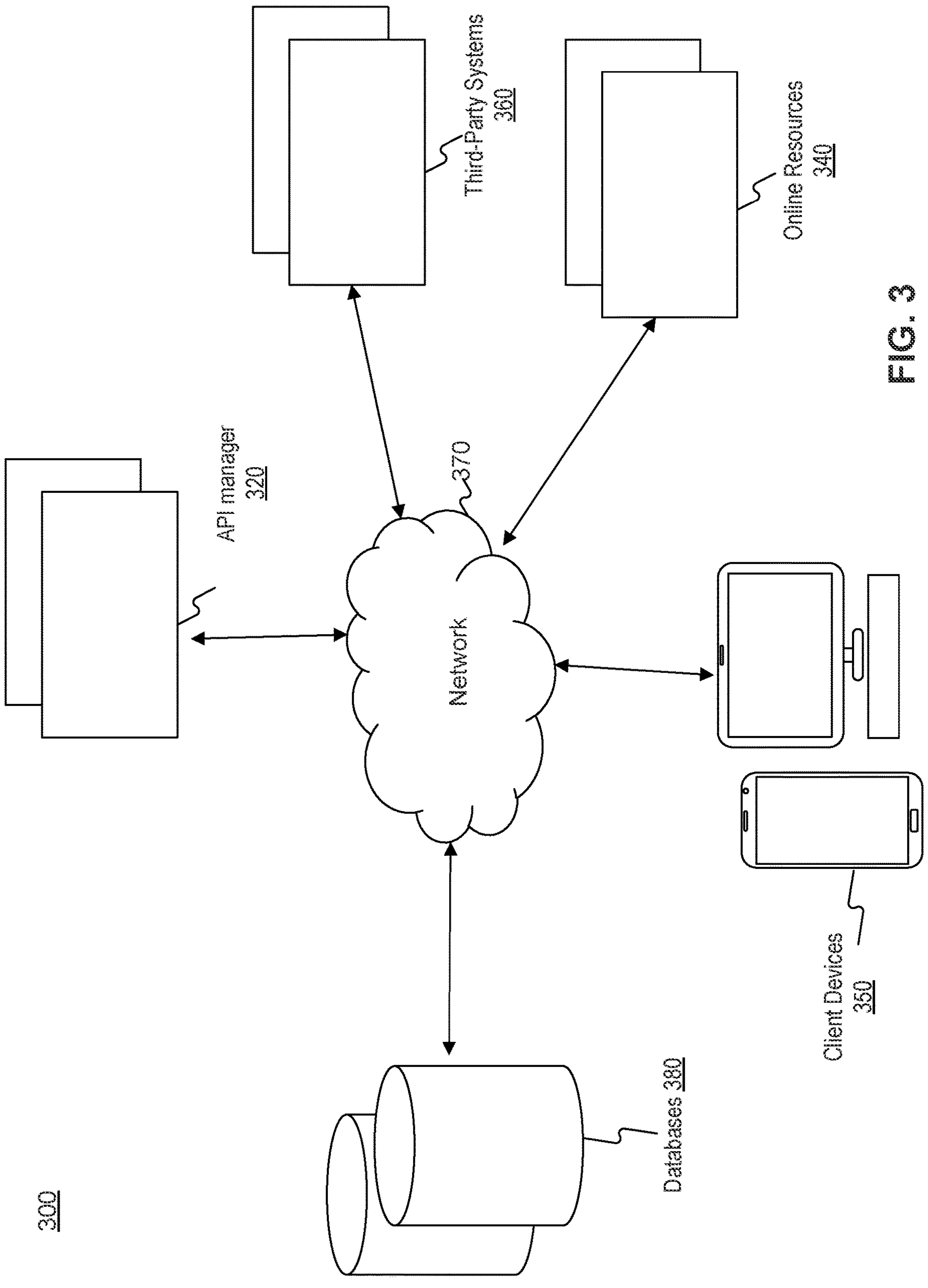
FIG. 3 is a schematic block diagram of an exemplary system, consistent with disclosed embodiments.

FIG. 3 is a block diagram of an exemplary system 300, consistent with disclosed embodiments. In system 300, an API manager 320 may include servers, computer modules, and/or data processing centers configured to process information requests from real-time client device's data streams. For example, API manager 320 may handle request from outside communications (e.g., API manager 320 may be part of external front end system 103), internal requests from other divisions within the system (e.g., API manager 320 may be part of internal front end system 103), communications between different portions of system 100 (e.g., API manager 320 may interface WMS 119 and FMG 115). In these multiple scenarios, API manager 320 may process API calls and resolve client requests. API manager 320 may also be coupled with clients and/or third parties (e.g., through 3PL systems 121A-121C) that may request information or interactions with backend systems. Further, API manager 320 may provide information to resolve client requests for information or operations in the database.

In some embodiments, API manager 320 may also perform operations to update or migrate APIs used to interface with different clients. For instance, API manager 320 may perform operations to segregate client populations between different APIs and make API assignments during a migration or tests. For example, as further discussed in connection with FIG. 12, API manager 320 may perform operations to run comparative and compatibility testing between different APIs and implement API assignments based on the results. In some embodiments, API manager 320 may include network analyzers to evaluate the performance of APIs and to calculate API metrics.

Additionally, or alternatively, in some embodiments, API manager 320 may be implemented with one or more of the components of system 100 (FIG. 1A). For example, API manager 320 may be part of SAT system 101, external front-end system 103, FO system 113, SCM system 117, and/or WMS 119 (FIG. 1A). In other embodiments, API manager 320 may be implemented with one or more independent servers configured to perform operations for providing content to client devices and/or generating webpages for client devices 350.

System 300 may include, in addition to API manager 320, online resources 340, client devices 350, third-party systems 360, and databases 380. In some embodiments, as shown in FIG. 3, components of system 300 may be connected to a network 370. However, in other embodiments components of system 300 may be connected directly with each other, without network 370. For example, databases 380 may be directly coupled to API manager 320.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources

340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102 (FIG. 1A) and be operated as part of system 100. In other embodiments, however, client devices 350 may be independent from system 100. Client devices 350 may include one or more processors configured to execute software instructions stored in memory, such as memory included in client devices 350, to perform operations to implement the functions described below. For example, client devices 350 may be configured to communicate with API manager 320 to request information for displaying webpages or transmitting client requests. Further, client devices 350 may be configured to perform operations according to instructions transmitted by API manager 320, such as callback scripts or functions. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

In some embodiments, as further described below in connection to FIG. 4, client devices 350 may run applications specifically configured to interact with API manager 320. Moreover, client devices 350 may store one or more accounts. For example, client devices 350 may store information about a customer's delivery preferences, the customer's location, customer account, and customer identification for authentication during API exchanges.

The disclosed embodiments are not limited to any particular configuration of client devices 350. For instance, a client device 350 may be a mobile device that stores and executes mobile applications to perform operations that provide functions offered by API manager 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Databases 380 may include one or more computing devices configured with appropriate software to perform operations consistent with providing API manager 320 data of customer accounts, API configurations, metrics (such as API metrics), and reports. Databases 380 may include, for example, Oracle™ databases, Sybase™ databases, or other relational databases or non-relational databases, such as Hadoop™ sequence files, HBase™, or Cassandra™. Databases 380 may also include computing components (e.g., database management system, database server, etc.) configured to receive and process requests for data stored in memory devices of the database(s) and to provide data from the database(s).

While databases 380 are shown separately, in some embodiments databases 380 may be included in, or otherwise related to API manager 320 or online resources 340.

Databases 380 may be configured to collect and/or maintain data associated with user accounts and API assignations or recorded communications. For example, databases 380 may store information about user profiles for users of system 300. Further, databases 380 may store information about addresses and client IDs, including delivery methods for specific address and/or client IDs. Databases 380 may also store previously generated API mapping tables and may store API plugins. Databases 380 may collect the data from a variety of sources, including, for instance, online resources 340 or third-party systems 360. Further, databases 380 may include information about client devices 350 operating systems. Databases 380 are further described below in connection with FIG. 5.

In some embodiments, third-party systems 360 may include one or more elements of system 100. For example, third-party systems 360 may include 3PL systems 121A-121C (FIG. 1). Additionally, or alternatively, third-party systems 360 may include one or more servers or storage services provided by an entity related to API manager 320, such as a service providers or a fulfillment center. Third-party systems 360 may also be connected to system 300 via network 370, but in other embodiments third-party systems 360 may include direct connections with some elements of system 300. For example, to minimize delays or network congestion, certain third-party systems 360 may be connected in a private network with API manager 320. Further, third-party systems 360 may be configured to provide and/or request information from API manager 320 to access information from other elements of system 300. In some embodiments, while third-party systems 360 may also be coupled to network 370, they may not be clients of API manager 320.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 4:
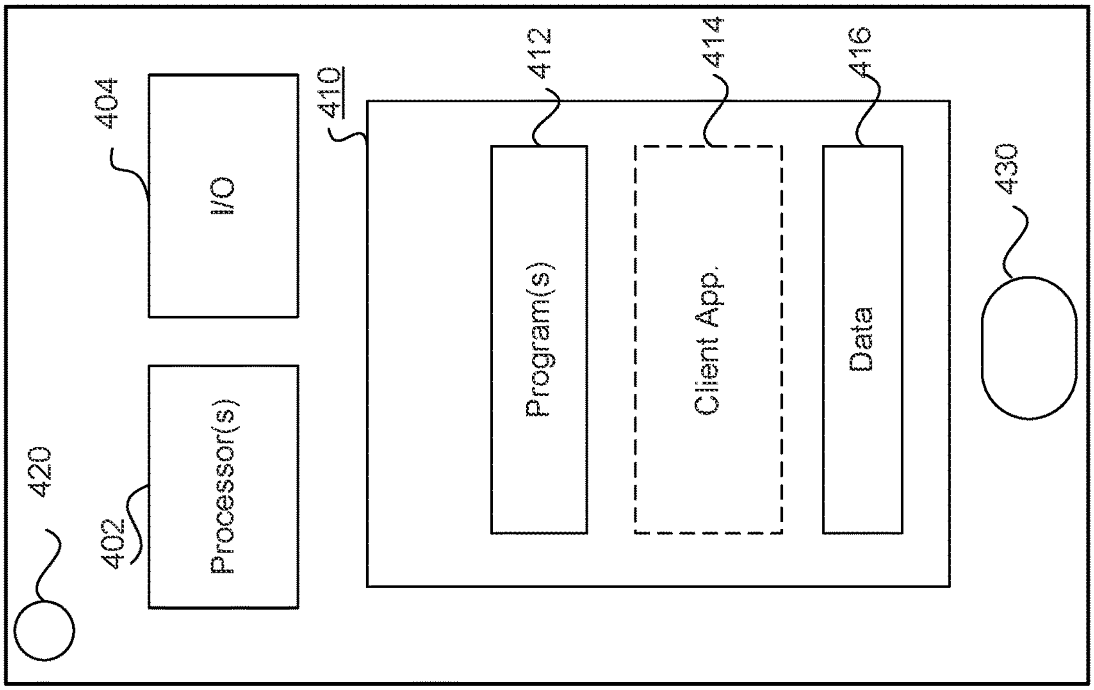
FIG. 4 is a block diagram of an exemplary client device, consistent with disclosed embodiments.

Referring now to FIG. 4, there is shown a block diagram of an exemplary client device 350 (FIG. 3), consistent with disclosed embodiments. In some embodiments, client devices 350 may implement user devices 102A-B (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to communicate with API manager 320 and/or generate product information requests, as further described in connection with FIG. 7. In addition, client applications 414 may interpret instructions for generating graphical user interfaces (GUI) in client devices 350 or modifying displayed GUI. Memory 410 may also store data 416 that may be used by API manager 320 to generate and maintain clusters of information.

In certain embodiments, memory 410 may store instructions for accessing or sending requests to API manager 320. For example, memory 410 may include an application that communicates with API manager 320 via TCP/IP. Moreover, other software components may be configured to request information from API manager 320 or determine the location of client devices 350. For instance, these software instructions, when executed by processor(s) 402, may use APIs to request information from databases 380 and/or request information updates. The software instructions may also implement scripts to modify webpages being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with API manager 320.

In some embodiments, client device 350 may also include a camera 420 that capture images and may be used for identification of a product that the user wants. Such identification may trigger requests for content information for display. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
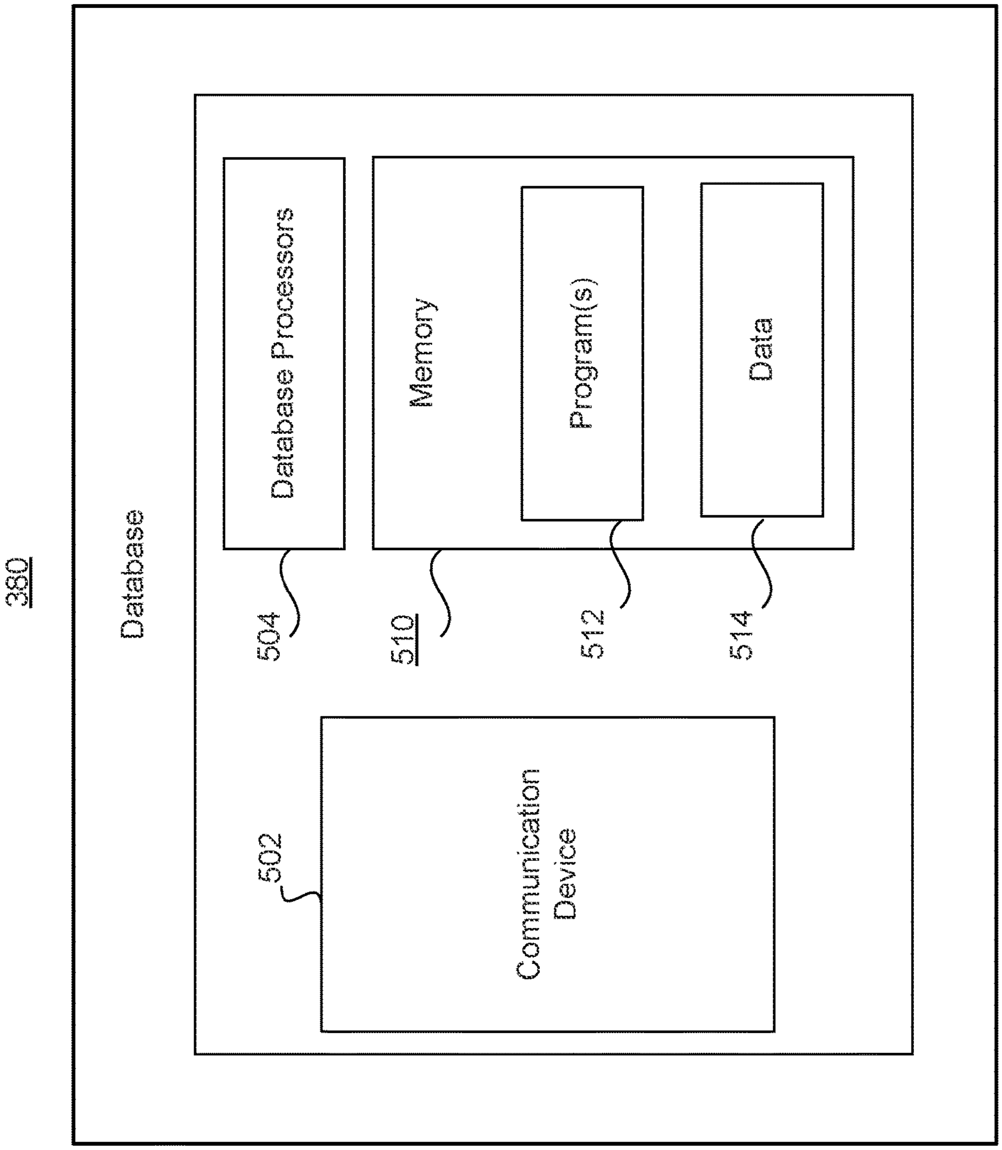
FIG. 5 is a block diagram of an exemplary database, consistent with disclosed embodiments.

Referring now to FIG. 5, there is shown a block diagram of an exemplary one of databases 380 (FIG. 3), consistent with disclosed embodiments. In some embodiments, databases 380 may be included in elements of system 100. For example, databases 380 may be part of external front-end system 103 or the WMS 119 (FIG. 1A).

Databases 380 may include a communication device 502, one or more database processors 504, and database memory 510 including one or more database programs 512 and data 514. Databases 380 may include NoSQL databases such as HBase, MongoDB™ or Cassandra™. Alternatively, databases 380 may include relational databases such as Oracle, MySQL and Microsoft SQL Server.

In some embodiments, databases 380 may be servers, general purpose computers, mainframe computers, or any combination of these components. In some embodiments, databases 380 are included within other elements of system 300, such as API manager 320. Other implementations consistent with disclosed embodiments are possible.

In some embodiments, databases 380 may include both non-relational and embedded databases. For example, databases 380 may include a non-relational database, such as an Hbase, and an embedded database, such as a RocksDB (e.g., a key-value store database).

Communication device 502 may be configured to communicate with one or more components of system 300 or system 100, such as online resources 340, API manager 320, or SCM system 117. In particular, communication device 502 may be configured to communicate through API manager 320 with client devices 350 or other elements of system 300.

The components of databases 380 may be implemented in hardware, software, or a combination of both hardware and software. For example, although one or more components of databases 380 may be implemented as computer processing instruction modules, all or a portion of the functionality of databases 380 may be implemented instead in dedicated electronics hardware.

Database memory 510 may include programs 512, which may include instructions to generate clusters of records and or respond to information requests from client devices 350. Further, database memory 510 may include instructions for communications between elements of system 300. For example, database memory 510 may include instructions for communications between client devices 350 and API manager 320. Further, programs 512 may include instructions to store information in real-time as it is processed by API manager 320.

Data 514 may also be data associated with webpages, such as information of online resources 340, or user accounts from client devices 350. Data 514 may include, for example, information relating API assignments or communication preferences.

Figure 6:
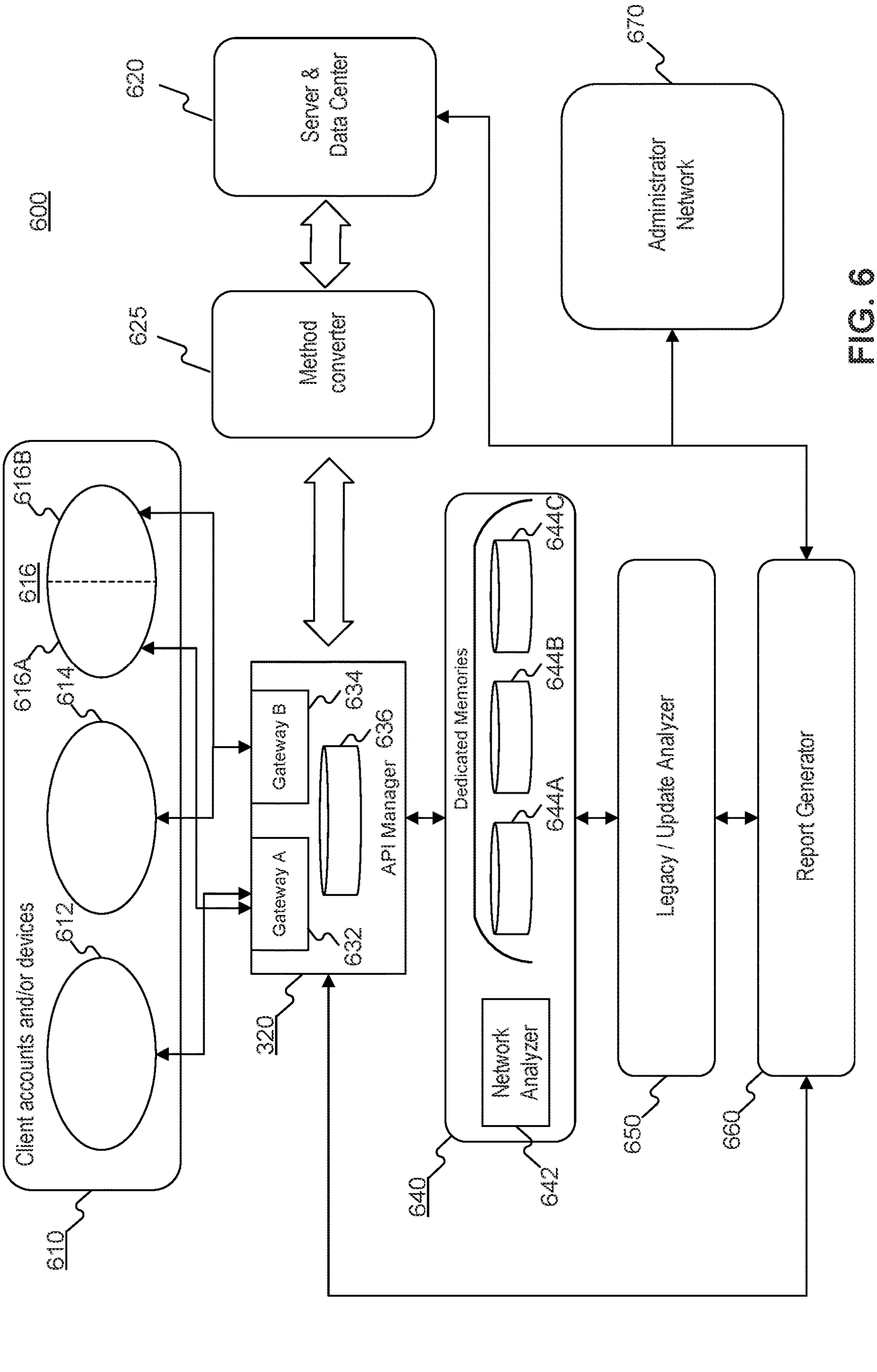
FIG. 6 is a block diagram of an exemplary API migration system, consistent with disclosed embodiments.

FIG. 6 is a block diagram of an exemplary API migration system 600, consistent with disclosed embodiments. In API migration system 600, API manager 320 (FIG. 3) may be connected to client accounts 610, servers & data centers 620, communication analyzer 640, and report generator 660.

Client accounts 610 may include users in system 300 (FIG. 3) which may interact with other elements of system 300 through API manager 320. For example, client accounts 610 may include accounts associated with client devices 350, third-party systems 360, and/or online resources 340. In some embodiments, client accounts may include accounts of shoppers, accounts of internal services, and customers of an online retailer. Additionally, or alternatively, client accounts 610 may include accounts associated with sellers (e.g., accounts connected through seller portal 109), workers (e.g., specified in labor management system 125), or fulfillment centers (e.g., FMG 115). As shown in FIG. 6, client accounts may be divided in multiple groups. API manager 320 may categorize client accounts 610 in different groups to implement and manage APIs for each one of the groups with specific configurations. For example, client accounts 610 may be categorized in a first group 612, a second group 614, and a third group 616. In some embodiments, as shown in FIG. 6, each one of the groups may be independent from each other (i.e., each group has unique accounts) and the groups sample a portion of the total number of claim accounts 610. In other embodiments, however, first group 612, second group 614, and third group 616 may share some accounts and/or may encompass the total number of accounts.

Division of client accounts 610 into first group 612, second group 614, and third group 616 may be based on group segmentation rules. In such embodiments, API manager 320 may implement group segmentation rules to divide client accounts 610 for API testing. The group segmentation rules may include, for example, a group size rule so that each one of the groups should have the same number of accounts. The segmentation rules may also include an account diversity rules which may require each group to have at least one account associated with internal API calls, one account associated with external API calls, and/or accounts generating periodic calls. For instance, segmentation rules may specify that each group should include an account with at least a request per minute. The account categories may also include new accounts and returning accounts and segmentation rules may require each group to have both new and old accounts. Group segmentation rules may also include a specific number of accounts (e.g., each group should include at least 1000 accounts) and include rules for geographical segmentation. Further, in some embodiments the segmentation rules may divide accounts based on the originating type of device, requiring each group to include, for instance, accounts related to mobile devices, accounts related to servers, and accounts related to desktop computers. Moreover, group segmentation rules may specify relationships between the sizes of different groups requiring, for example, that first group 612, is larger than second group 614, and that third group is larger than first group 616. This type of segmentation may be significant to guarantee the statistical significance of API system evaluation.

In some embodiments, group segmentation rules may be configured to be dynamic and change based on behavior of accounts. For example, API manager 320 may monitor activity for accounts in each one of the group. If API manager 320 determines that an account is inactive, it may substitute that account with a different one from an ungrouped account.

In some embodiments, as shown in FIG. 6, third group 616 may be subdivided into a first portion 616A and a second portion 616B. As further discussed in connection with FIG. 12, subdividing third group 616 may allow running compatibility tests in an isolated group that runs multiple APIs concurrently. Simultaneous operations of different APIs in a group of users may reveal incompatibilities or redundancies that under API performance.

Client accounts 610 may connect to API manager 320 through API gateways. In some embodiments, API manager 320 may include multiple API gateways, such as API gateway A 632 and API gateway B 634. API gateway A 632 and API gateway B 634 may sit between client accounts 610 and backend services interfaced by API manager 320. In some embodiments, API gateway A 632 and API gateway B 634 may act as a reverse proxy to accept API calls, aggregate the various services required to fulfill them, and return the appropriate result. Moreover, API gateway A 632 and API gateway B 634 may handle tasks such as user authentication, rate limiting, and statistics.

In some embodiments, API gateway A 632 and API gateway B 634 may be configured to decouple client interfaces from backend implementations. Thus when one of client accounts 610 makes a request, API gateway A 632 and API gateway B 634 may break the request into multiple requests, route them to the right modules (as further described in connection with FIG. 7), produce a response, and track of additional calls.

In some embodiments, API gateway A 632 and API gateway B 634 may be dedicated to different API groups or systems, may be assigned to different accounts, and may be configured to work concurrently. For example, while API gateway A 632 handles calls from first group 612, API gateway B 634 may handle calls from second group 614. Further, while API gateway A 632 may conduct calls for processing with a legacy API (with previously deployed functions and operations), API gateway B 634 may conduct calls for processing with an update or modified API (with new functions and operations). Having this multiplicity of API gateways allows API manager 320 to test and compare performance of different API in automated assays by assigning different APIs to different groups of client accounts. Such configuration may allow API manager 320 to perform an automated split testing or bucket testing for comparing performance and compatibility of two or more APIs. As shown in FIG. 6, in some embodiments API manager 320 may configure API gateway A 632 to handle communications from first group 612 and first portion 616A and configure API gateway B 634 to handle communications from second group 614 and second portion 616B. For example, API manager 320 may assign API gateway A 632 and API gateway B 634 to specific accounts using an API mapping table specifying a group of users and the assigned gateway.

In addition to gateways, API manager 320 may also include a metadata storage 636 which may log data from API gateway A 632 and API gateway B 634. For example, metadata storage 636 may record bucket access controls, channels, default object controls, notifications, objects, keys, and projects that are received from client accounts 610 through the gateways. In some embodiments, information stored in metadata storage may be used for calculation of API metrics, as further described in connection with FIG. 14.

API manager 320 may be connected with servers & data centers 620 and request information after processing API calls. For example, API manager 320 may process requests from client devices associated with client accounts 610 and request information from servers & data centers 620 to resolve the client request. In some embodiments, when a user requests item information through an API call, API manager 320 may fetch that information from servers & data centers 620 to relay it to the client. In some embodiments, servers & data centers 620 may include servers of an online retailer. Alternatively, API manager 320 may be connected to servers & data centers 620 via a method converter 625 which may translate instructions between different syntaxes to interact with servers & data centers 620. For example, when API calls are received in one format but API manager has determined that the format is no longer usable, or efficient, API manager 320 may instruct method converter 625 to adjust the instructions to a selected format.

In addition to being coupled with servers & data centers 620, API manager 320 may also be coupled to communication analyzer 640, which may capture and sort communications coming through API manager 320 to perform comparative and compatibility evaluations. Communication analyzer 640 may include a network analyzer 642. Network analyzer 642 may be configured to filter and capture packets of communications from and to client accounts 610. In some embodiments, API manager 320 may label communications handled with each one of the concurrent API's to facilitate filtering or sorting by network analyzer 642. In addition, communication analyzer 640 may include dedicated memories 644A-644C that may be configured to store packets or data from communication for each one of the segregated groups. To facilitate later analysis of the performance of each API and each client account group, dedicated memories 644A-644C may be configured to exclusively store data associated with one of the segregated groups. For instance, dedicated memory 644A may store data related to first group 612, dedicated memory 644B may store data related to second group 614, and dedicated memory 644C may store data related to third group 616. This isolation of data may facilitate later data processing. In some embodiments, network analyzer 642 may be configured to capture packets incoming from client devices associated with the client accounts (in the first group, the second, and the third group) and storing the captured packages from each group in independent memory spaces, such as dedicated memories 644A-644C.

As shown in FIG. 6, communication analyzer 640 may be coupled to legacy/update analyzer 650, which may estimate metrics and evaluate the performance of APIs and their compatibility. For example, based on information in dedicated memories 644A-644C, legacy/update analyzer 650 may determine infrastructure API metrics, application API metrics, and API product metrics to compare the performance of APIs handle by API gateway A 632 and API gateway B 634. Further, legacy/update analyzer 650 may determine API compatibility, analyzing for example, the behavior of HTTP response codes. Legacy/update analyzer 650 is further described in connection with FIG. 10.

Legacy/update analyzer 650 may provide information to a report generator 660, which may generate compatibility and/or comparative reports for the API performance. For example, report generator 660 may generate alerts when one of the tested APIs has a worse performance than the other, or may provide recommendation as to which functions or processes are causing incompatibilities. In some embodiments, report generator 660 may send emails or messages to an administrator network 670 broadcasting alerts or recommendations. Report generator 660 may also be configured to transmit instructions to API manager 320. For instance, in some embodiments legacy/update analyzer 650 may conclude that an updated or current API is performing better than a legacy API. Further legacy/update analyzer 650 may determine that there are no significant comparability issues. In such scenarios, report generator 660 may transmit instructions to API manager 320 to switch accounts assigned to the legacy API in favor of the update API. In some embodiments, API manager 320 may turn off API gateway A 632 and reassign client accounts associated with the legacy API to be handled by the updated API.

Figure 7:
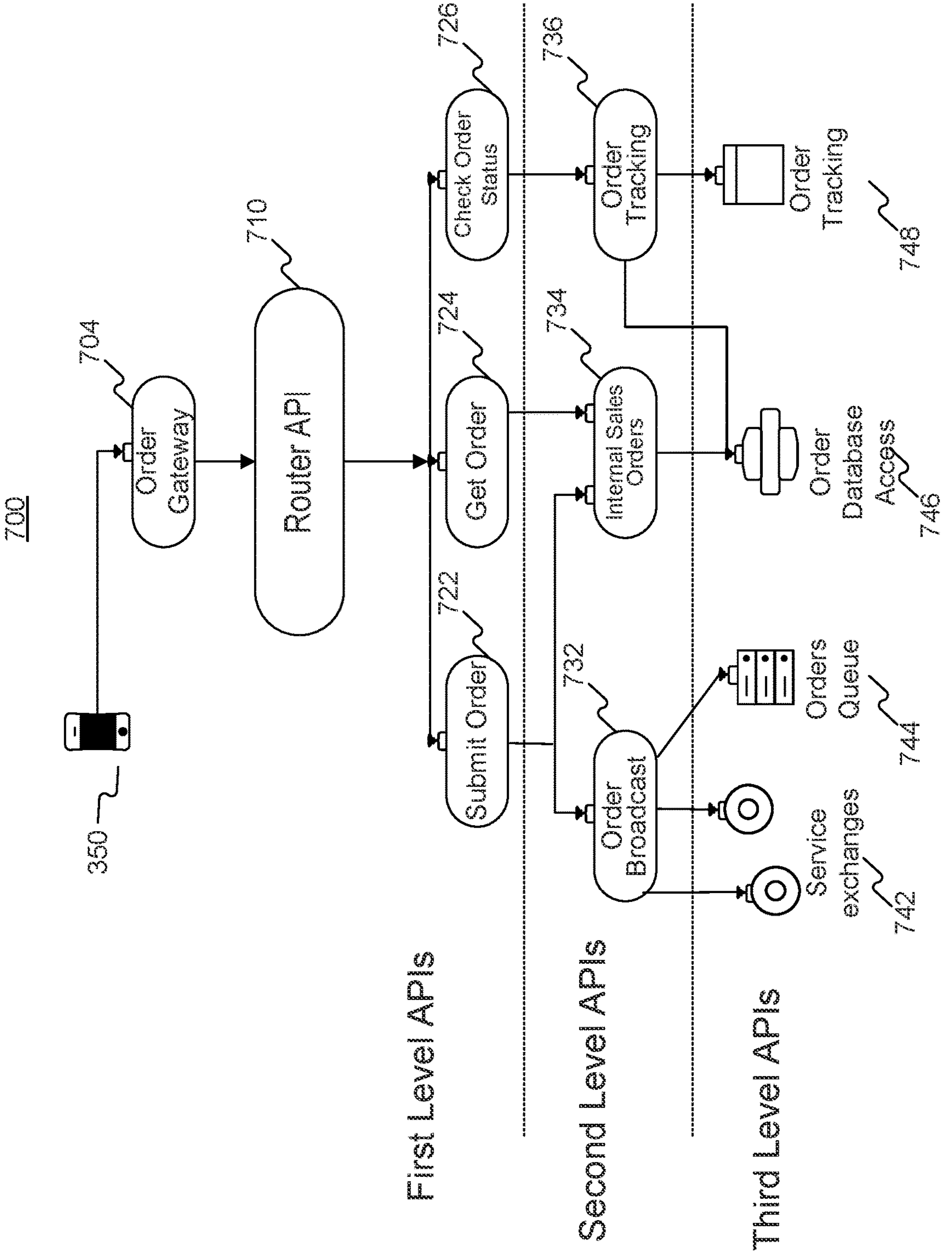
FIG. 7 is a block diagram of an exemplary API routing system, consistent with disclosed embodiments

FIG. 7 is a block diagram of an exemplary API routing system 700, consistent with disclosed embodiments. System 700 may be employed to resolve API calls from client devices 350 by selecting different levels and types of APIs. Further in system 700 each group of client devices 350 may be assigned to different API groups and/or pathways to enable automated comparison of the complete API operation.

In system 700, an order gateway 704 may receive requests from client devices 350. In some embodiments, order gateway 704 may be implemented with a stream-processing software to collected streams of information and process them in real-time, further described in connection with FIG. 8. Order gateway 704 may provide information to router API 710 which may route client requests and API calls to different API services. For example, router API 710 may route API calls to a legacy API system when it identifies the request is coming from an account associated with first group 612 while routing API calls to an updated API system when it determines the request is coming from an account associated with the second group 614. In some embodiments, router API 710 may select one of API gateway A 632 or API gateway B 634 for processing the request based on API mapping tables and information extracted by order entry 704.

Router API 710 may guide the request through different internal APIs that may include multiple levels of APIs. First level APIs may generate content, features, and functionality of several other APIs. First level APIs may specify project data formats, interaction timings, or protocols into a specific channel and context. First level APIs may include functions of submit order 722, get order 724, and check order status 726.

First level APIs may communicate with second level APIs. Second level APIs may combine data and coordinate other APIs for specific tasks. For example, second level APIs may support a portfolio of enterprise offerings (e.g., products and services). Second level APIs may include functions for order broadcast 732, internal orders 734, and order tracking 736. These functions may enable logic and orchestration. Unlike other levels, the second level APIs do not communicate with end systems directly but instead connects to third level APIs to get data. In some embodiments, second-level APIs use representational state transfer functions (REST) to aggregate data from multiple systems.

Second level APIs may communicate with third level APIs, which may be configured to return information to client devices 350 and/or enable direct interactions between client devices 350 and the backend systems. Third level APIs may support more than one value stream and/or enterprise capability. Third level APIs may be configured to communicate with the systems using, for example, direct Java calls or SAP calls. The third level APIs may handle system specific connections and settings and exposes resources and standard format. Third level APIs may include functions for service exchanges 742, orders queue 744, order database access 746, and order tracking.

Legacy API and updated API may include each one of first- to third-level APIs. Thus, API routing system 700 shows an exemplary pathway configuration to resolve API calls from client devices 350, but a similar process may be performed to handled differently sourced calls. For instance, a similar architecture may be employed to handle internal requests for information and/or to communicate fulfillment centers.

Figure 8:
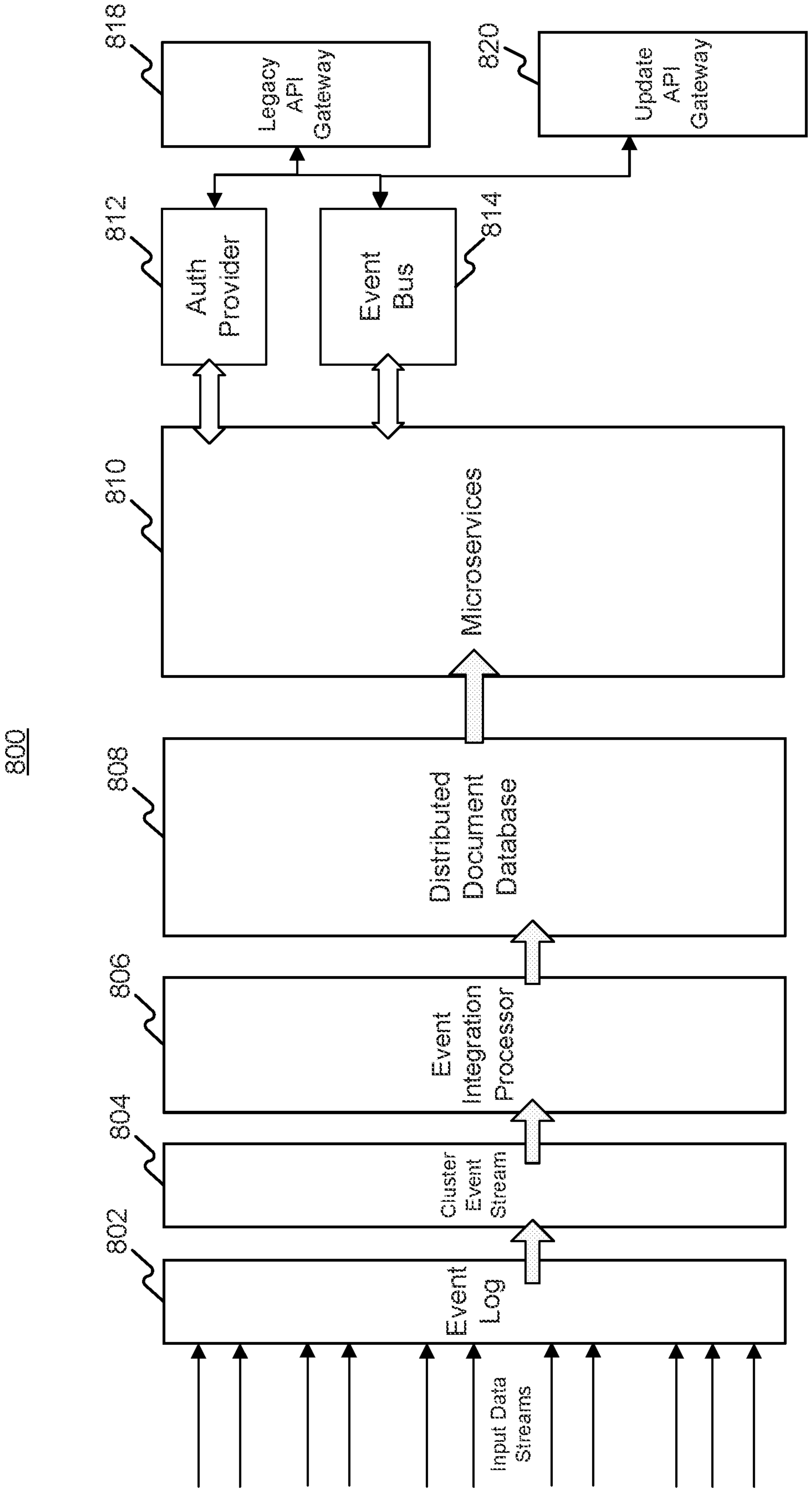
FIG. 8 is a block diagram of an exemplary API call process flow, consistent with disclosed embodiments.

FIG. 8 is a block diagram of an exemplary API call process flow 800, consistent with disclosed embodiments. Process flow 800 describes how API manager 320 may handle data streams (e.g., stream of API calls from client devices 350). For example, API manager 320 may process and sort streams of API calls for comparative or split-run API testing using process flow 800. In some embodiments, through process flow 800 API manager 320 may route streams of API calls into multiple API gateways.

In process flow 800, an event log 802 may receive incoming data streams. The incoming data streams may include a stream of API calls or requests from client devices and users of the system that request information or operations. For example, incoming data streams may include orders and/or tracking requests. In some embodiments, event log 802 may be implemented with stream-processing software, such as Apache Kafka, that provide high-throughput handling of real-time feeds. For example, event log 802 may include a Java stream processing library and use binary TCP-based protocol relying on on a "message set" abstraction that naturally groups messages together to reduce the overhead of the network roundtrip.

Event log 802 may then communicate message sets and/or processed data stream to a cluster event stream 804. Cluster event stream 804 may generate groups of clusters of incoming data calls and provide, based on the generated groups, an optimized engine to support general operation executions. In some embodiments, cluster event stream 804 may create batches of data streams based on intervals, geography, and/or client account classification. This clustering of data may optimize API calls by batching them based on similar requests and/or communication pathways. In some embodiments, cluster event stream 804 may be implemented with Apache Spark.

The clustered events may be transmitted to an event integration processors 806, which may include event-driven applications for use cases such as real-time analytics, data integration, notification management, and adaptive decision-making. Event integration processors 806 may capture events from diverse data sources, process and analyze them, integrate with multiple services and data stores, and publish output to various endpoints in real-time. The integrated events may then be stored in unstructured documents of distributed document store 808. Distributed document store 808 may be implemented with a NoSQL database program that allow ad-hoc queries, indexing, replication, and load balancing.

A microservices module 810 may consume data in distributed document store 808 to identifying events and process events in virtualized cores. For example, microservices module 810 may employ a plurality of event-driven application frameworks running in dedicated virtual cores. The microservices module 810 may process and filter API calls (even if they are using different versions of the API functions or configurations) and normalize or transform them for later processing by, for example, API manager 320.

At microservices module 810, process flow 800 may have parsed and normalized real-time data streams to facilitate their identification and routing. Performing this preparatory stages, allows the differentiation of API calls under different API systems (e.g., legacy vs. current) to perform bucket testing. By going through event log 802, cluster event stream 804, and even integration processor 806, it is possible to identify groups and route them correctly to one of the API systems while collecting relevant information for later evaluation and/or comparison.

Microservices module 810 may communicate with an authentication provider 812, which may verify the validity of the processed API calls, and an event bus 814, which may organize the calls to feed them into an API gate way. Authentication provider 812 may include token-based authentication and/or implement security components at each microservice in microservices module 810. Event bus 814 may handle interservice communications. In some embodiments, event Bus 814 may act as a mediator channel for asynchronous event-driven communication. Further, event bus 814 may support publish/subscribe, distributed, point to point, and request-response messaging. In some embodiments, event bus 814 may allow clients to communicate with corresponding server nodes using event bus 814.

Authentication provider 812 and event bus 814 may communicate with both legacy API gateway 818 and update API gateway 820. For example, authentication provider 812 may provide verification for API calls in the incoming data stream while event bus 814 may provide information about the specific request and associated tagged metadata generated by microservices module 810 and/or event integration processor. In some embodiments, legacy API gateway 818 and update API gateway 820 may be implemented with API gateway A 632 and API gateway B 634 (FIG. 6).

Figure 9:
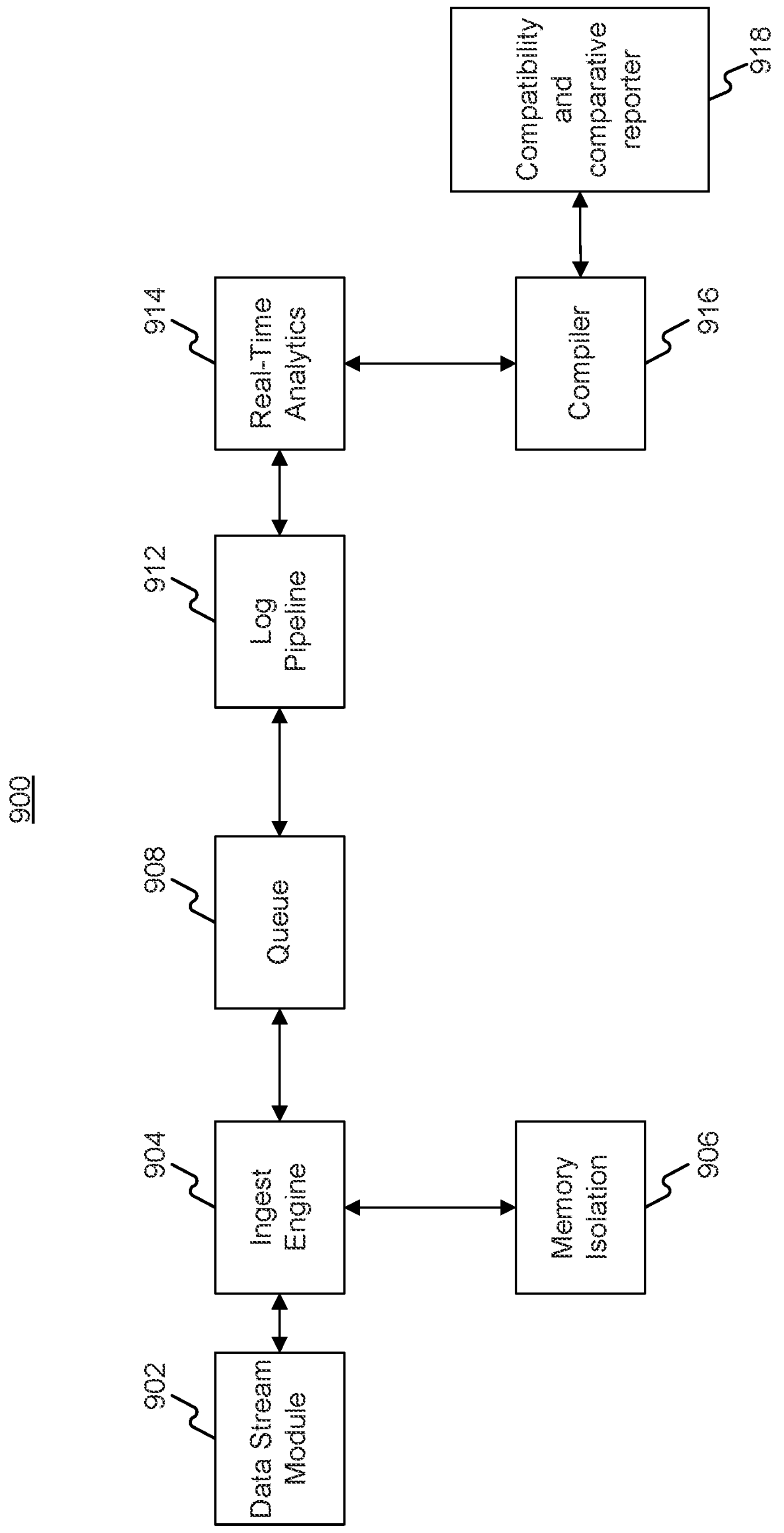
FIG. 9 is a block diagram of exemplary system for analysis and comparison of API calls, consistent with disclosed embodiments

FIG. 9 is a block diagram of exemplary system 900 for analysis and comparison of API calls, consistent with disclosed embodiments. In some embodiments, system 900 may be a subsystem of system 600. For example, system 900 may implement legacy/update analyzer 650 when API manager 320 targets to make real-time evaluations of API performance.

System 900 may include a data stream module 902 which may receive information from a network analyzer and/or communications associated with a group of client accounts. For example, data stream module 902 may receive information from network analyzer 642 (FIG. 6) as it captures packages or information of communications going through API manager 320. Data stream module 902 may transmit this information to an ingest engine 904, which may perform data filtering, identification, or normalization. For example, ingest engine 904 may perform automated data ingestion with data preparation features to structure and organize API calls so they can be analyzed in real-time. Ingest engine 904 may perform both batched and streamed ingestion of API calls.

In some embodiments, ingest engine 904 may store the processed data in dedicated memories, such as dedicated memories 644A-C(FIG. 6), through a memory isolation module 906. Additionally, or alternatively, ingest engine 904 may provide information to a queue module 908 that sorts data from two or more API systems. This organized data may then be transmitted to a real-time analytics module 914 through a log pipeline 912. The real-time analytics may estimate API metrics based on records of API calls handled with each API system. As further described in connection with FIG. 14, real-time analytics module 914 may quantify performance based on metrics of API interactions. For example, real-time analytics module 914 may determine metrics such as latency, compatibility, and error metrics based on the information coming through log pipeline 912. Moreover, in some embodiments real-time analytics module 914 may perform additional testing of two or more APIs. For instance, real-time analytics module 914 may send identical GET, POST, and PUT requires to multiple APIs and compare results.

Output from real-time analytics module 914 may be transmitted to a compiler 916 which may aggregate estimated metrics and determine statistics that are relayed to a compatibility and comparative reporter 918, which may generate compatibility and comparative reports between different API systems. Compatibility and comparative reporter 918 may use metrics generated by real-time analytics module 914 to determine, for example, if an updated APIs are compatible with legacy APIs and/or if they have improved metrics. Further, compatibility and comparative reporter 918 may generate reports specifying functions or routines causing incompatibilities. In such embodiments, compatibility and comparative reporter 918 may include issues with source compatibility (e.g., code written against legacy APIs failing to compile against updated APIs), and binary compatibility (e.g., code compiled against legacy APIs failing to link/run against an Update APIs libraries). Moreover, compatibility reports may also include wire compatibility, describing communication errors between legacy and updated APIs, and semantic compatibility, indicating unexpected results.

In some embodiments, compatibility and comparative reporter 918 may generate alerts or reports comparing performance of APIs. For instance, compatibility and comparative reporter 918 may generate results from an online JavaScript Object Notation (JSON) comparer detailing inputs and responses of the endpoints under test in the online comparer and repeat for every endpoint.

Figure 10:
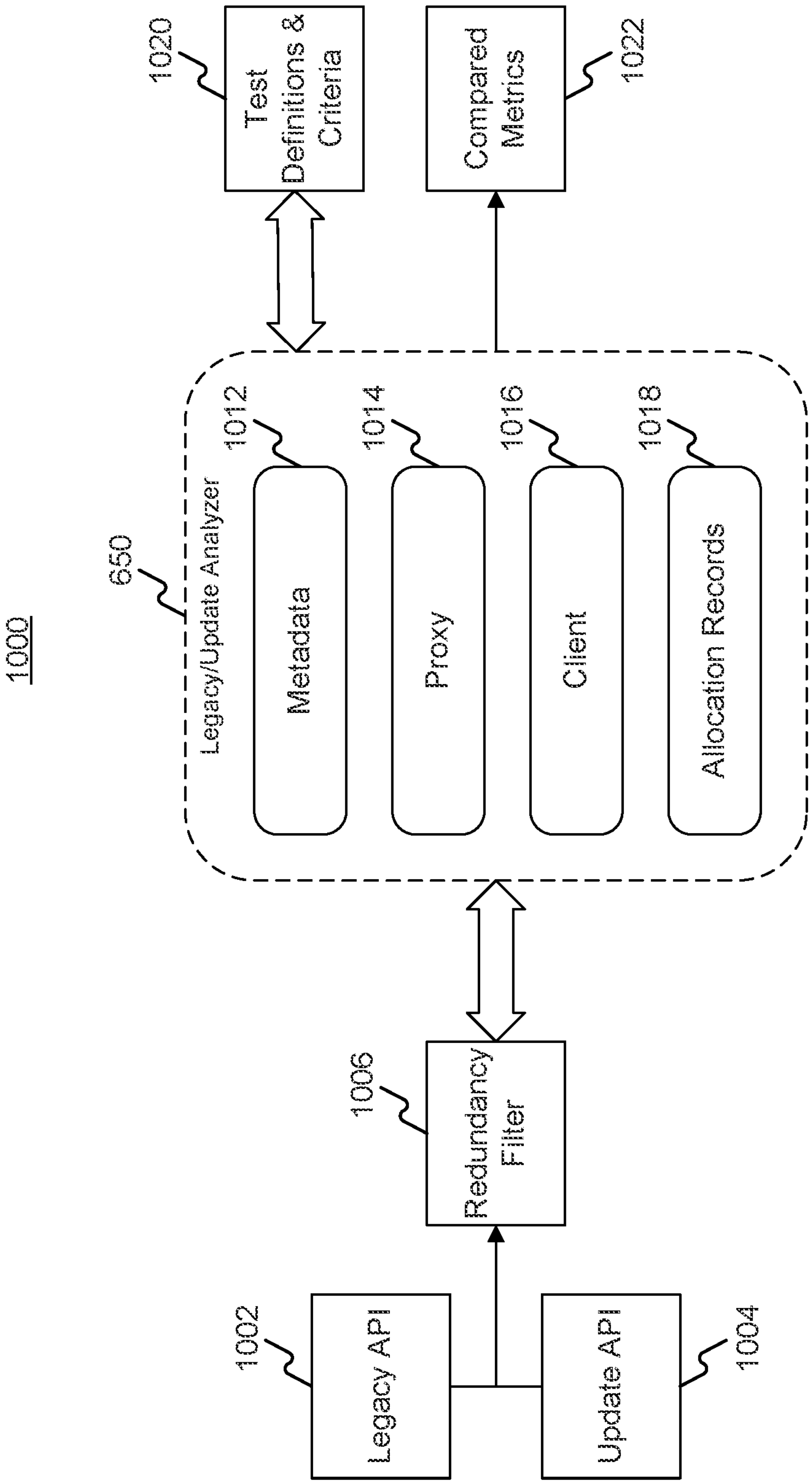
FIG. 10 is a block diagram of an exemplary split-run testing system for API migration, consistent with disclosed embodiments.

FIG. 10 is a block diagram of an exemplary split-run testing system 1000 for API migration, consistent with disclosed embodiments. Split-run testing system 1000 shows a configuration of legacy/update analyzer 650 (FIG. 6) for automated comparative evaluation of two or more APIs.

As shown in FIG. 10, legacy/update analyzer 650 may include a plurality of modules for comparing the performance and determining the compatibility of two APIs. The modules may include a metadata comparer 1012, proxy comparer 1014, client comparer 1016, and allocations records 1018. Metadata comparer 1012 may compare metadata in communications for each one of the APIs. For instance, metadata comparer 1012 may retrieve and analyze metadata in communications such as addresses, locations, and times from each one API call or communication handled by the different API gateways. Proxy comparer 1014 may compare running times and use of computation resources of each API. For example, proxy comparer 1014 may compare API runtimes, number of interactions with backend systems, and number of responses sent back to the API client. Further, proxy comparer 1014 may determine differences between security measure. Proxy comparer 1014 may compare backend protections and success rate of authentications.

Client comparer 1016 may compare the API clients utilizing each one of the API systems. For example, client comparer 1016 may identify and evaluate API customers using each one of the APIs. For instance, client comparer 1016 may store devices or accounts sending requests to each API. Client comparer 1016 may also evaluate usage level by each API client and use of software development kits (SDKs) during API client's interactions. Allocations records 1018, may compare allocation and retrieval requests from each API requested through representational state transfer (REST) API endpoints to the back server. Moreover, allocation records 1018 may implement allocation rules which are compared to context passed from the legacy and update APIs. Allocation records 1018 may also store the allocation of computing resources assigned for responding to requests associated with the multiple APIs.

Modules in legacy/update analyzer 650 allow automated evaluation of the performance of two APIs. For example, legacy/update analyzer 650 may use metadata comparer 1012, proxy comparer 1014, client comparer 1016, and allocations records 1018, to generate comparative and/or compatibility metrics that allow automated evaluation and, tentative migration, of different APIs. Thus, in some embodiments, legacy/update analyzer 650 may output compared metrics 1022 which may reflect the comparative performance between legacy and updated APIs.

As shown in FIG. 10, legacy/update analyzer 650 may be coupled to a test definition 1020 and a redundancy filter 1006. Testing definition 1020 may be defined by, for example, administrator network 670 (FIG. 6) and may specify the length of API call collection, the number of API systems to be tested, and/or specify client account segmentation rules. Redundancy filter 1006, may be coupled to systems of legacy API 1002 and updated API 1004. For example, legacy API 1002 and updated API 1004 may be coupled to API gateway A 632 and API gateway B 634 respectively. To facilitate the comparative evaluation and minimize resources used during comparative analysis, redundancy filter 1006 may remove calls that have the same characteristics in both legacy and updated APIs. Between legacy API 1002 and updated API 1004 some functions may remain unchanged. For example, certain basic operations may survive from one version of the API to the other. For certain situations (e.g., when evaluating compatibility) tracking similar or redundant calls between the two API systems may be unnecessary and/or cause extraneous monitoring. Thus, redundancy filter 1006 may eliminate redundant calls to remove them from the split-run analysis. Other embodiments, however, may target more general approaches and collect even redundant calls to evaluate interaction between multiple components of each API system.

FIG. 11 is an exemplary API mapping table 1100 for split-run testing, consistent with disclosed embodiments. API mapping table 1100 may include API clients 1102, describing user groups or categorizations. For example, in API mapping table 1100 rows could include client account groups such as legacy group 1110 (e.g., first group 612), update group 1112 (e.g., second group 614), compatibility group A (e.g., first portion 616A), and compatibility group B (e.g., second portion 616B). For each on of the API clients 1102, API mapping table 1100 may specify an assigned API. As shown in FIG. 11, the assigned API 1104, which may be selected from one of two options "API 1" and "API 2." For example, API mapping table 1100 may specify that legacy group 1110 and compatibility group A 1112 use a legacy API (e.g., through API gateway A 632 in FIG. 6) while update group 1112 and computability group B use an updated API (e.g., through API gateway B 634).

API mapping table 1100 may also specify methods associated with the APIs and/or permitted with each one of the API client 1102 groups. In some embodiments, the different APIs may have the same methods and functions. In other embodiments, as represented in FIG. 11, different APIs may have different methods and/or include additional methods and functions.

Moreover, API mapping table 1100 may specify test scenarios 1108 for each one of the API clients 1102 groups. For example, API mapping table 1100 may determine the type of analysis that legacy/update analyzer 650 will perform and provide parameters for the testing definition 1020 (FIG. 10). Further, API mapping table 1100 may specify whether legacy/update analyzer 650 will be comparing loading times, response times, and/or write times for each one of the API clients 1102 groups.

Figure 12:
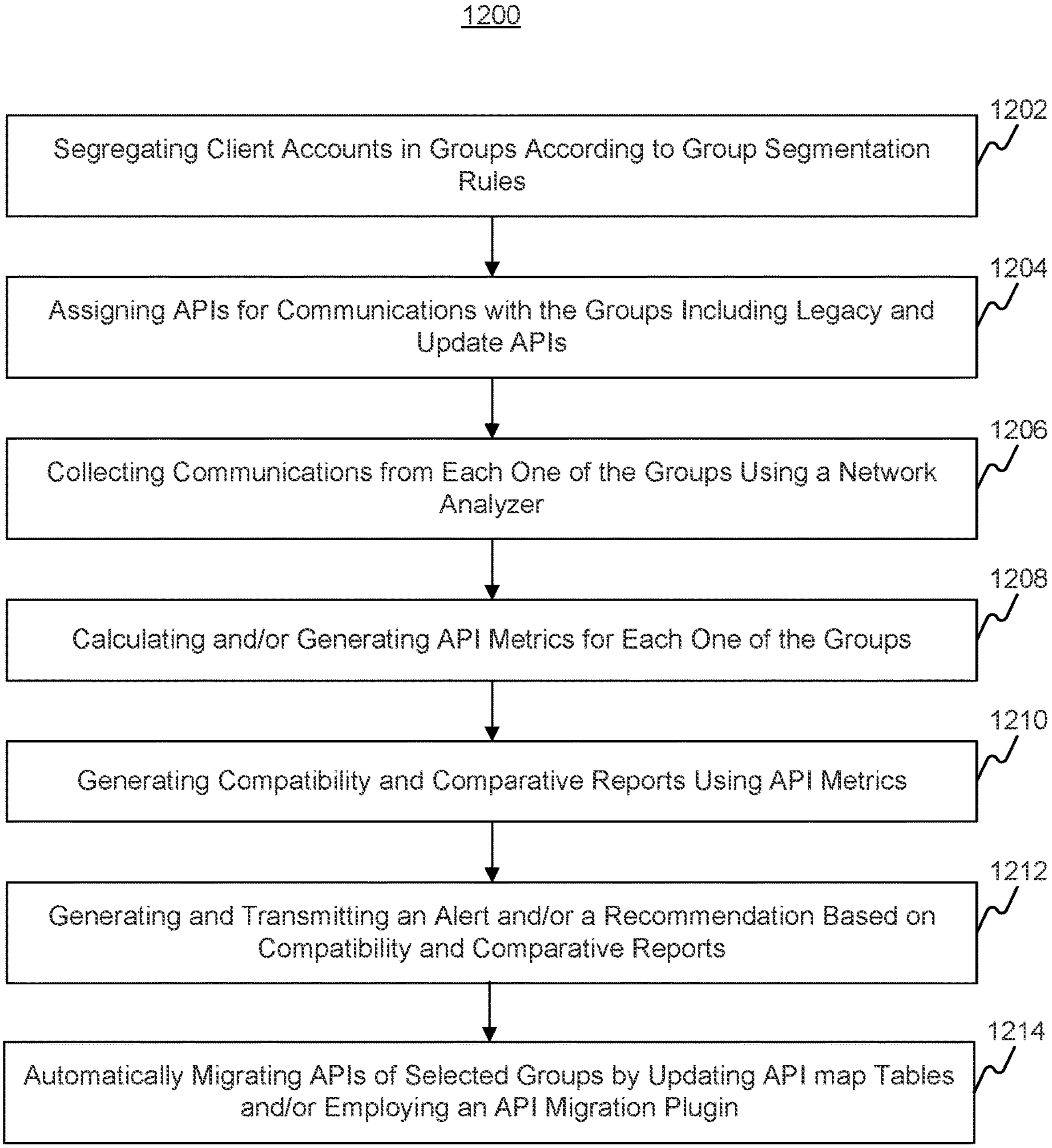
FIG. 12 is a flow chart of an exemplary API migration testing process, consistent with disclosed embodiments.

FIG. 12 is a flow chart of an exemplary API migration testing process 1200, consistent with disclosed embodiments. In some embodiments, elements of system 300 may perform process 1200. For example, as disclosed in the steps description below, API manager 320 may perform process 1200. Alternatively, or additionally, third-party systems 360 may perform process 1200, or parts of process 1200. Further, in other embodiments system 100, or parts of system 100, may perform process 1200. For instance, external front-end system 103, internal front-end system 105, and/or FMG 115 may perform process 1200.

In step 1202, API manager 320 may segregate client accounts in groups according to group segmentation rules. For example, API manager 320 may take a population of client accounts (such as client accounts 610 in FIG. 6) and divided it in three or more groups subpopulations, such as first group 612, second group 614, and third group 616 to start API testing/evaluation. For such division, API manager 320 may employ the group segmentation rules, which may include having the same number of accounts in each one of the subpopulations, having the same number of mobile devices in each one of the subpopulations, and/or maximize the diversity of accounts in each one of the populations. For instance, API manager 320 may generate subpopulations in which there is at least one category of user accounts, where the user accounts may include outside retailer, third-party vendor, user accounts, and/or inside departments. Alternatively, or additionally, group segmentation rules may specify the relative size of the client account groups. For example, in some embodiments API manager 320 may generate groups so that the first group and the second group comprise a larger number of client accounts than the third group.

In some embodiments, as shown in FIG. 6, in step 1202 API manager 320 may segregate client accounts in a first group, a second group, and a third group, each group having distinct members. For example, as previously discussed in connection with FIG. 6, API manager 320 may divide a client population in three groups and generate subgroups that may be used to evaluate API compatibility.

In step 1204, API manager 320 may assign APIs for communications with the groups generated in step 1202. The APIs selected for communication may include legacy and update APIs. For example, API manager 320 may configure an API mapping table specifying API gateways responding to API calls from the different groups. Additionally, or alternatively, API manager 320 may configure an API router, such as router API 710 (FIG. 7), to resolve API calls with different API systems based on addresses and/or client IDs. In some embodiments, in step 1204 API manager may assign a first API (e.g., a legacy API) for communications with the first group and a second API (e.g., a new or modified API) for communications with the second group. In step 1204 and assign the first API for communications with a first portion of the third group and the second API for communications with a second portion of the third group.

In step 1206, API manager 320 may collect communications from each one of the groups using a network analyzer, such as network analyzer 642 (FIG. 6). For example, API manager 320 may configure a network analyzer to capture communications related to API calls from each one of the groups formed in step 1202. In some embodiments, API manager 320 may collect communications at a router point to handle bidirectional communications (e.g., API requests and responses) and configure it to collect the data for a predetermined interval that provides a significant sample. The collection may be defined for a specific time interval, in order to collect a sufficient number of samples that result in statistically significant data, or may be performed in real-time as data streams arrive. For instance. API manager 320 may configure a network analyzer to collect information during a few hours of expected high traffic to collect an ample and varied number of API calls. In such embodiments, in step 1206 API manager 320 may collect, during the time interval, communications from the first group, the second group, and the third group, and generating API metrics associated with each group. Alternatively, or additionally, API manager 320 may perform the communication collection in real-time using, for example, process flow 800 to process and evaluate streams of data. Further, API manager 320 may filter communications in step 1206 to facilitate processing and generating API metrics. For example, in step 1206 API manager 320 may implement redundancy filter 1006 to filter duplicated API calls or identify behavior that remained unchanged between a legacy API 1002 and an update API 1004.

In step 1208, API manager 320 may calculate and/or generate API metrics for each one of the groups. Based on the results form API calls associated with each one of the groups in step 1202, API manager 320 may estimate API metrics such as infrastructure, application, and/or product metrics to evaluate the performance of the APIs. For example, in some embodiments API manager 320 may determine API metrics for legacy and updated APIs. As further discussed in connection with FIG. 14, API manager 320 may determine the API metrics based on the specific API application and/or the calls captured in the sample. In embodiments in which API manager 320 includes system 900, generating metrics may include employing real-time analytics module 914 (FIG. 9) to calculate the metrics. Alternatively, or additionally, API manager 320 may communicate with legacy/update analyzer 650 to estimate performance of two or more APIs and generate compared metrics 1022.

In step 1210, API manager 320 may generate compatibility and comparative reports using the API metrics of step 1208. For example, API manager 320 may generate reports of mismatched metrics, inconsistent calls, or poor infrastructure performance. As further described in connection with FIG. 13, API manager 320 may compare API metrics and/or scores against thresholds when generating compatibility and comparative reports. In some embodiments, the comparative reports may compare API metrics between legacy and updated API operation. For example, a comparative report may include the metrics associated with calls in the legacy an updated metrics. Further, the compatibility reports may specify API metrics in groups that are operating both legacy and updated APIs. In such embodiments, the compatibility report may identify mismatches between the APIs to try to identify if operating the two APIs concurrently generates compatibility issues that affect the overall system. In some embodiments, in step 1210 API manager 320 may request compatibility and comparative reports from report generator 660 (FIG. 6).

The compatibility report may allow API manager 320 evaluate the effect of having users operating two API systems concurrently. In some situations, clients may not be able to update their systems in view of the API changes or updates. Thus, it becomes necessary to operate both APIs (legacy an updated) concurrently. The compatibility report may identify issues with concurrent API operations. The compatibility report may specify source compatibility, binary compatibility, wire compatibility, and semantic compatibility. The compatibility report may indicate whether between legacy and update APIs there are any removed or renames services, a change in HTTP binding, change of type of fields, or changes in resource formats. The compatibility report may also specify specific calls that have changed the URL format in the HTTP definition. Additionally, or alternatively, the compatibility report may specify source, binary, and semantic compatibility errors between APIs.

Moreover, in certain embodiments API manager 320 may also generate a comparative report comparing the API metrics associated with the first group and the API metrics associated with the second group while generating a compatibility report based on the API metrics associated with the third group (which is operating with both APIs). In such embodiments, API manager 320 may use a JSON or GSON comparers, to evaluate how each API is handling different requests or methods. In such embodiments, API manager 320 may employ a JSON path extractor post-processor that compares metadata and keys for similar communications in each API system. Moreover, the comparative report may specify mismatches between API calls from the first group and a difference between the metrics associated with the first and the second groups.

In some embodiments, comparative and compatibility reports may include a score. API manager 320 may determine the comparative score based on the comparative report and a compatibility score based on the compatibility report. API manager 320 may determine comparative scores that provide, in a single number, an assessment of the performance between two APIs. For example, when API metrics associated with the legacy API are poorer than metrics associated with the update API, the comparative score may be positive and high. In contrast, when API metrics associated with the legacy API are better than metrics associated with the update API, the comparative score may be negative and/or low. The comparative report may also include a threshold comparison.

Similarly, API manager 320 may calculate a compatibility score based on the compatibility report. If there are many functions that are no incompatibility or many errors in the communication coming from groups using legacy and update API concurrently, API manager 320 may assign a low and/or negative compatibility score. But if there is no incompatibilities and error rates from groups using legacy and update API concurrently are low, API manager 320 may assign a high and/or positive score.

In step 1212, API manager 320 may generate and transmit an alert and/or a recommendation based on compatibility and comparative reports. For example, when the comparative reports indicate the legacy API has a better performance than the updated API, API manager 320 may generate a recommendation not to switch to the updated API and/or propose modifications for the API. Further, in step 1212 API manager 320 may generate alerts when any of the API metrics of step 1208 are below a threshold and/or when API manager 320 finds incompatibilities, such as syntax incompatibilities, between different calls. Thus, in step 1212 API manager 320 may transmit at least one of an alert or a recommendation based on the comparative report and the compatibility report. As further discussed in connection with FIG. 16, the alert and/or recommendation may include instructions for displaying a graphical user interface with the recommendations. In some embodiments, alerts and messages regarding compatibility and comparability of APIs may be transmitted through administrator network 670. In such embodiments, the alert or recommendation may include mismatched API calls and API manager 320 may generate the alert or recommendation by automatically broadcasting a message in administrator network 670.

In some embodiments, alerts and recommendations in step 1212 may include specific information. For example, the alert may include metrics associated with the third group below compatibility thresholds and the recommendations may include at least one of an updated API map table and a migration API plugin. Updated API mapping tables may include a table, such as API mapping table 1100 (FIG. 11) with modified information based on recommendation or alerts. The migration API plugin may include a step by step wizard that guides administration through an API migration process. For example, the migration plugin may create a migration package for APIs that can be downloaded along with an installer script. The migration plugin may also allow users to upload the installer script to a cloud environment and run a migration wizard that converts API calls and URLs to comply with interfacing conditions of servers & data centers. For example, a migration plugin may be installed in method converter 625 and provide tools for renaming or modifying the syntax of API calls.

In step 1214, API manager 320 may automatically migrate APIs of selected groups by updating API map tables and/or employing an API migration plugin. In some embodiments, the migration may be based on the recommendations or alerts of step 1212. For example, when API manager 320 generates an alert indicating that legacy systems are outperforming the update APIs, API manager 320 may automatically migrate client accounts assigned to update APIs to the legacy APIs. This migration may involve reconfiguring API gateways or routers to resolve API calls using the legacy API. Alternatively, or additionally, based on the recommendations API manager 320 may automatically migrate client accounts in groups assigned to legacy APIs to update APIs when both compatibility and comparative scores of step 1210 exceed a threshold. For example, when API manager 320 performs bucket testing with the configuration shown in FIG. 6, API manager 320 may assigning the second (update) API to first group 612 and the third group 616 in response to determining the comparative score and the compatibility score are above a threshold.

API manager 320 may perform the automated migration by reconfiguring API mapping tables, such as API mapping table 1100 (FIG. 11), or by executing API migration plugins. For example, based on recommendation or alerts of step 1212 API manager 320 may program API gateway A 632 and API gateway B 634 (FIG. 6) to route content to specific APIs. Moreover, in some embodiments in step 1214 API manager 320 may automatically adjust API mapping instructions by, for example, substituting functions from legacy APIs with functions of update APIs. For instance, API manager 320 may establish equivalences between the API functions and determine a relationship to corresponding API functions in an updated system. In some embodiments, automated migration may include applying conversion functions or compiling tables to convert client instructions or requests from legacy API formats to the current or updates API. These conversion functions may include updating syntax of the calls using, for example, method converter 625.

Figure 13:
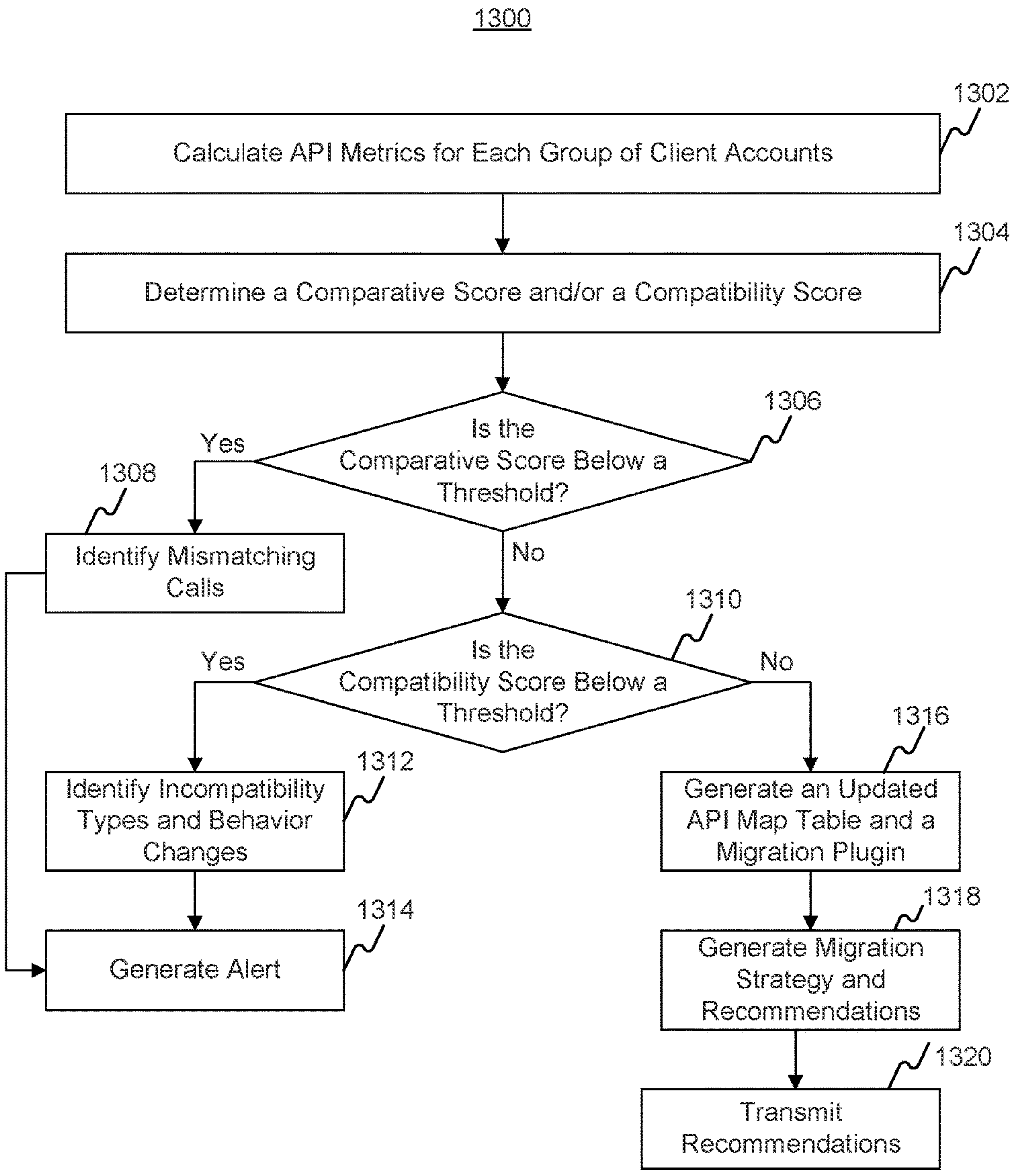
FIG. 13 is a flow chart of an exemplary API differential evaluation process, consistent with disclosed embodiments.

FIG. 13 is a flow chart of an exemplary API differential evaluation process 1300, consistent with disclosed embodiments. In some embodiments, elements of system 300 may perform process 1200. For example, as disclosed in the steps description below, API manager 320 may perform process 1300. Alternatively, or additionally, third-party systems 360 and/or databases 380 may perform process 1300, or parts of process 1300. Further, in other embodiments system 100, or parts of system 100, may perform process 1300. For instance, internal front-end system 105 and/or FMG 115 may perform process 1300. In some embodiments, process 1300 may follow process 1200. In other embodiments, however, process 1300 may be independent from process 1200.

In step 1302, API manager 320 may calculate API metrics for each group of client accounts. For example, API manager 320 may employ network analyzer 642 (FIG. 6) to collect communications associated with each group of client accounts and determine API metrics based on the communication logs.

In step 1304, API manager 320 may determine a comparative score and/or compatibility score. For instance, based on the API metrics, API manager 320 may determine an update API has better performance and a legacy API an generate a high comparative score. Further, based on the API metrics of groups of clients operating both APIs, API manager may determine whether there are no compatibility issues in operating APIs concurrently and generate a high compatibility score.

In step 1306, API manager 320 may determine whether the comparative score is below a threshold. If API manager 320 determines that the comparative score is below the threshold (step 1306: Yes), API manager 320 may continue to step 1308 and identify mismatching metrics or calls that cause lower performance. However, if API manager 320 determines that the comparative score is not below the threshold (step 1306: No), compatibility score may continue to step 1310.

In step 1310, API manager 320 may determine whether the compatibility score is below a threshold. If API manager 320 determines the compatibility score is below the threshold (step 1310: Yes), API manager 320 may continue to step 1312 and identify incompatibility types and behavior changes between the two APIs or between members of a population using the two APIs concurrently. After step 1312, and/or step 1308, API manager 320 may generate an alert or recommendation in step 1314. However, if in step 1310 API manager 320 determines the compatibility score is not below a threshold (step 1310: No), API manager 320 may continue to step 1316.

In step 1316, API manager 320 may generate an updated API mapping table and/or generate the migration plugin. For example, API manager 320 may update API mapping table 1100. The migration plugin may include one or more of different plugins that can be used to transfer the client accounts between different APIs. In some embodiments, in addition to migration wizards, the migration plugin may include deprecated functions to facilitate, identify, or build transition functions. The migration plugin may also include download functions, operations to determine existence of functions, explode functions, and normalization functions.

In step 1318, API manager 320 may generate a migration strategy and recommendations. For example, based compatibility and comparative scores, API manager 320 may generate recommendations to initiate a migration and when to initiate an API migration. In some embodiments, as further discussed in connection with FIG. 15, the recommendations may include a migration strategy to an updated API.

In step 1320, API manager 320 may transmit the recommendations. For instance, API manager 320 may transmit recommendations of step 1318 to devices associated with network managers. In some embodiments, the recommendations may be transmitted in real-time, or as the compatibility and comparative scores are being estimated.

Figure 14:
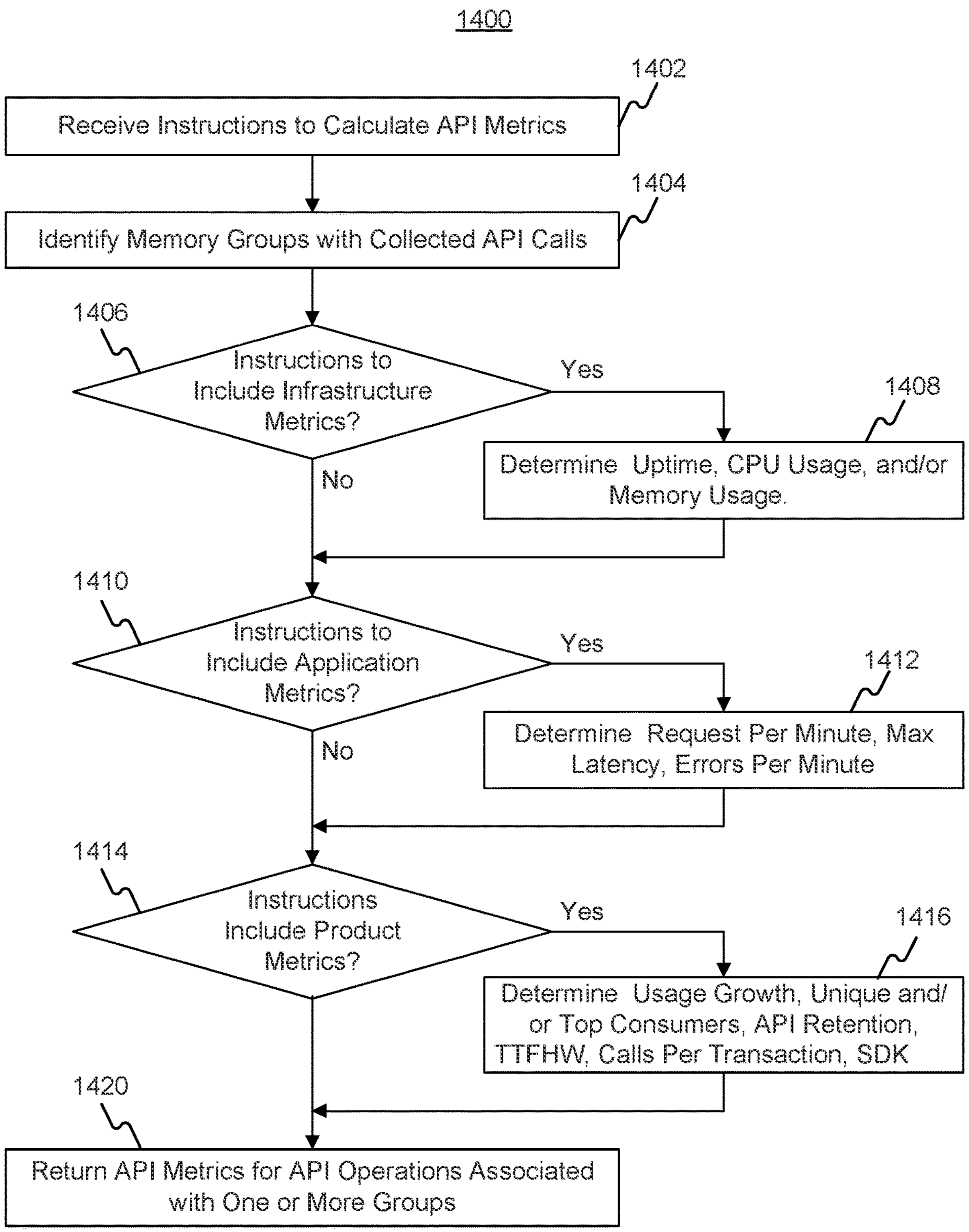
FIG. 14 is a flow chart of an exemplary process for determination of API metrics, consistent with disclosed embodiments.

FIG. 14 is a flow chart of an exemplary process 1400 for determination of API metrics, consistent with disclosed embodiments. In some embodiments, elements of system 300 may perform process 1400. For example, as disclosed in the steps description below, API manager 320 may perform process 1400. Alternatively, or additionally, legacy/update analyzer 650 may perform process 1400, or parts of process 1400. Further, in other embodiments system 100, or parts of system 100, may perform process 1400. For instance, internal front-end system 105 and/or FMG 115 may perform process 1400. In some embodiments, process 1400 may be part of process 1400. For example, process 1400 may be performed as part of step 1208 (FIG. 12). In other embodiments, however, process 1400 may be independent from process 1300.

In step 1402, API manager 320 may receive instructions to calculate API metrics. For example, API manager 320 may receive instructions from a network administrator to perform a comparative analysis of the performance of two APIs and request calculation of API metrics. In other embodiments, however, the request may be automatic and get generated after a collection period and/or based on network analyzer configurations.

In step 1404, API manager 320 may identify memory groups with collected API calls. For example, API manager 320 may identify memory spaces in which communications associated with the first, second, and third group have been stored. In step 1406, API manager 320 may determine if it is required to estimate infrastructure API metrics. If API manager 320 determines that it is required to estimate infrastructure API metrics (step 1406: Yes), API manager 320 may continue to step 1408.

In step 1408 API manager 320 may estimate infrastructure API metrics, which may include an Uptime metric, a CPU usage metric, and a memory usage metric. The uptime metric may measure the availability of API services. In some embodiments, the Up time metric may be based on the percentage of down time. Low uptime metric may indicate that the API is not responding as expected and may require some redundancy measurements. In some embodiments, API manager 320 may determine uptime metrics by evaluating a specific sequence of API calls. The CPU usage metric may measure API server CPU usage. Such metric may be correlated oversubscribed and overloaded applications such as too many spinlocks. To measure CPU usage, API manager may monitor activity in computer resources in a server and/or by including agents that captures metrics such as CPU and memory usage. Memory usage metrics, like CPU usage, also measure resource utilization as CPU and memory capacity. API manager 320 may determine memory usage using agents that monitor availability of memory sources. In some embodiments, memory usage metrics may also measure distribution of tasks among memories to evaluate whether APIs are overloading specific memory units.

If API manager 320 determines that it is not required to estimate infrastructure API metrics (step 1406: No), API manager 320 may skip step 1408 and continue to step 1410. In step 1410, API manager 320 determine whether it is required to estimate application metrics. If API manager 320 determines that it is required to estimate application API metrics (step 1410: Yes), API manager 320 may continue to step 1412.

In step 1412, API manager 320 may estimate application metrics, which may include requests per minute (e.g., API calls per minute), max latency for response, and errors per minute. To calculate request per minute, API manager 320 may be used to evaluate the performance of database and/or servers. API manager may identify whether APIs have a larger than expected number of requests per minute and seek if there are associated bugs that, for example, are causing repetitive calls. Alternatively, or additionally, the requests per minute may indicate that certain functions should be combined to reduce API calls. Moreover, API manager 320 may estimate latency to track delays in responses to client requests. In some embodiments, tracking changes in latency may indicate new endpoints are added, schema changes, and more operations get stalled. Thus API manager 320 may track each communication between server and clients through an API gateway to determine the average latency for each communication. API manager 320 may estimate other similar metrics such as RPS (Requests per Second) and QPS (Queries per Second).

Step 1412 may also include estimating errors per minute for each one of the APIs and/or the associated groups. For example, API manager 320 may determine a number of errors for number of API calls. Such metric may estimate bugs and error-proclivity of an API is. In some embodiments, API manager 320 may use HTTP status codes to determine the number of errors per minute.

If API manager 320 determines that it is not required to estimate application API metrics (step 1410: No), API manager 320 may skip step 1412 and continue to step 1414. In step 1414, API manager 320 determine whether it is required to estimate product metrics. If API manager 320 determines that it is required to estimate product API metrics (step 1414: Yes), API manager 320 may continue to step 1416.

In step 1416, API manager 320 may determine metrics such as Usage Growth, Unique and/or Top Consumers, API Retention, Time To First Hello World (TTFHW), Calls Per Transaction, and SDK adoption, among others. Moreover, API manager may determine product API metrics comprising number of unique API consumers and calls per business transaction.

If API manager 320 determines that it is not required to estimate product API metrics (step 1414: No), API manager 320 may skip step 1416 and continue to step 1420. In step 1420, API manager 320 may return the API metrics for API operations associated with one or more of the evaluated groups.

Figure 15:
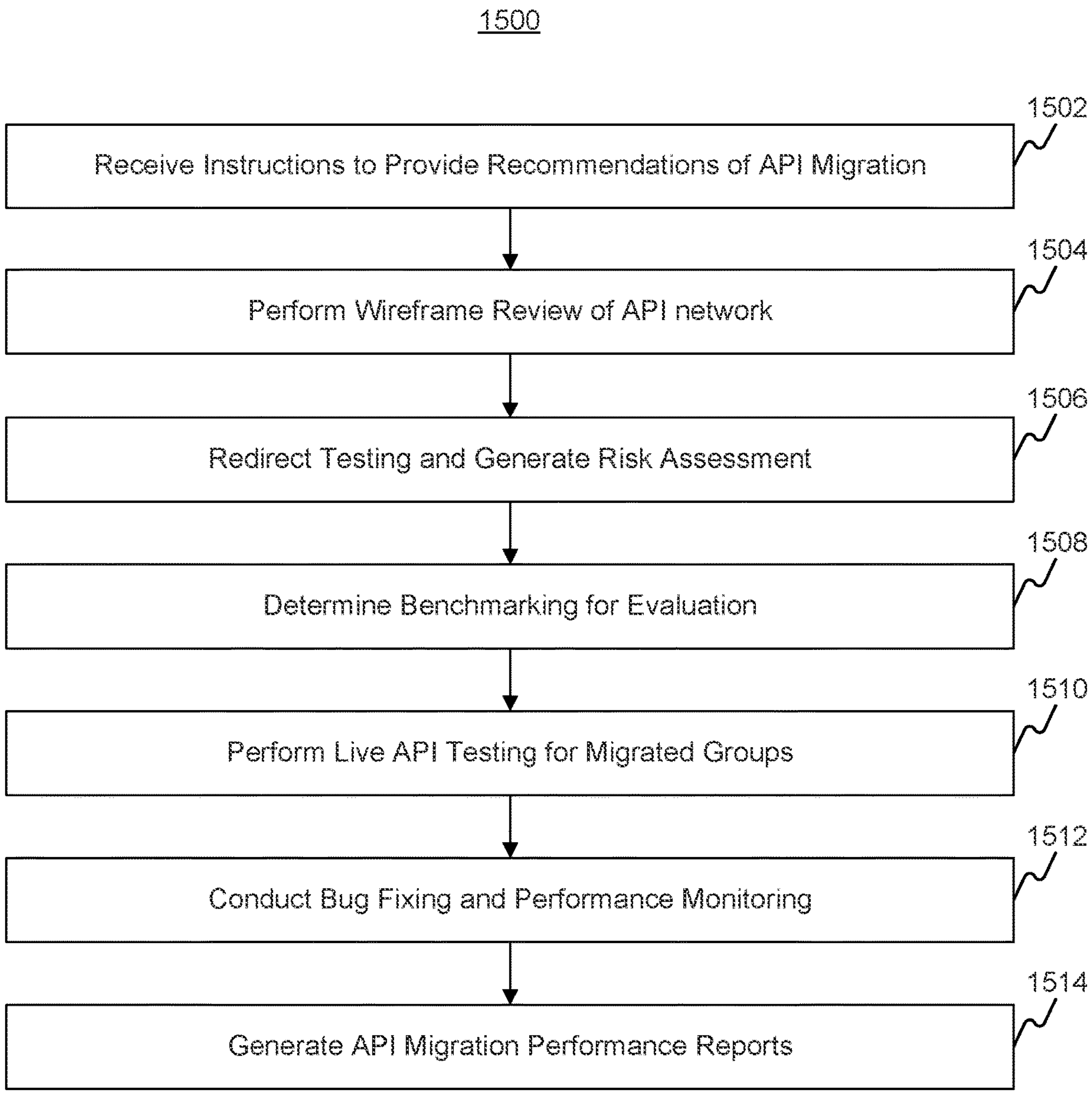
FIG. 15 is a flow chart of an exemplary process for executing recommendations of API migration, consistent with disclosed embodiments.

FIG. 15 is a flow chart of an exemplary process 1500 for executing recommendations of API migration, consistent with disclosed embodiments. In some embodiments, elements of system 300 may perform process 1500. For example, as disclosed in the steps description below, API manager 320 may perform process 1500. Alternatively, or additionally, third-party systems 360 may perform process 1500, or parts of process 1500. Further, in other embodiments system 100, or parts of system 100, may perform process 1500. For instance, internal front-end system 105 and/or FMG 115 may perform process 1500. In some embodiments, process 1500 may follow process 1200. In other embodiments, however, process 1500 may be independent from process 1200.

In step 1502, API manager 320 may receive instructions to provide recommendations of API migration. For example, when a comparative score is above a threshold, API manager 320 may receive instructions to generate recommendations for API migration.

In step 1504, API manager 320 may perform a wireframe review of the API network. For example, API manager 320 may generate a visual guide that represents the skeletal framework of the API and its connections. In some embodiments, the wireframe may include a range of API functions, priorities in API interactions of the information and functions, rules for displaying certain kinds of information, and effect of different scenarios on the display.

In step 1506, API manager 320 may configure redirect testing and generate a risk assessment. For example, API manager 320 may configure a redirect test engine that allows to test different APIs against each other. The redirect test may include different API calls are functions for each function. Further, API manager 320 may generate a risk assessment that includes scope, nature, quantification, tolerance, and treatment of the risk. For example, in step 1506 API manager 320 may determine whether the risk of API failure is operational, or financial, it may also estimate the probability of the risk during migration, and recommendations to reduce risks during migrations.

In step 1508, API manager 320 may determine benchmarking for evaluation. For example, API manager 320 may determine the threshold numbers for API metrics, compatibility scores, and comparative scores. In step 1510, API manager 320 may migrate groups and perform live API testing for migrated groups. For instance, API manager 320 may update API map tables and execute plugins and initiate performance monitoring for the groups with modified APIs through a network analyzer.

In step 1512, API manager 320 may perform bug correction and performance corrections, based on the metrics and occurrences recorded in step 1510. Based on the bug and performance corrections of step 1512, API manager 320 may generate API migration performance reports in step 1514. In some embodiments, API manager 320 may generate automatic reports with information about collected metrics and/or performance results.

Figure 16:
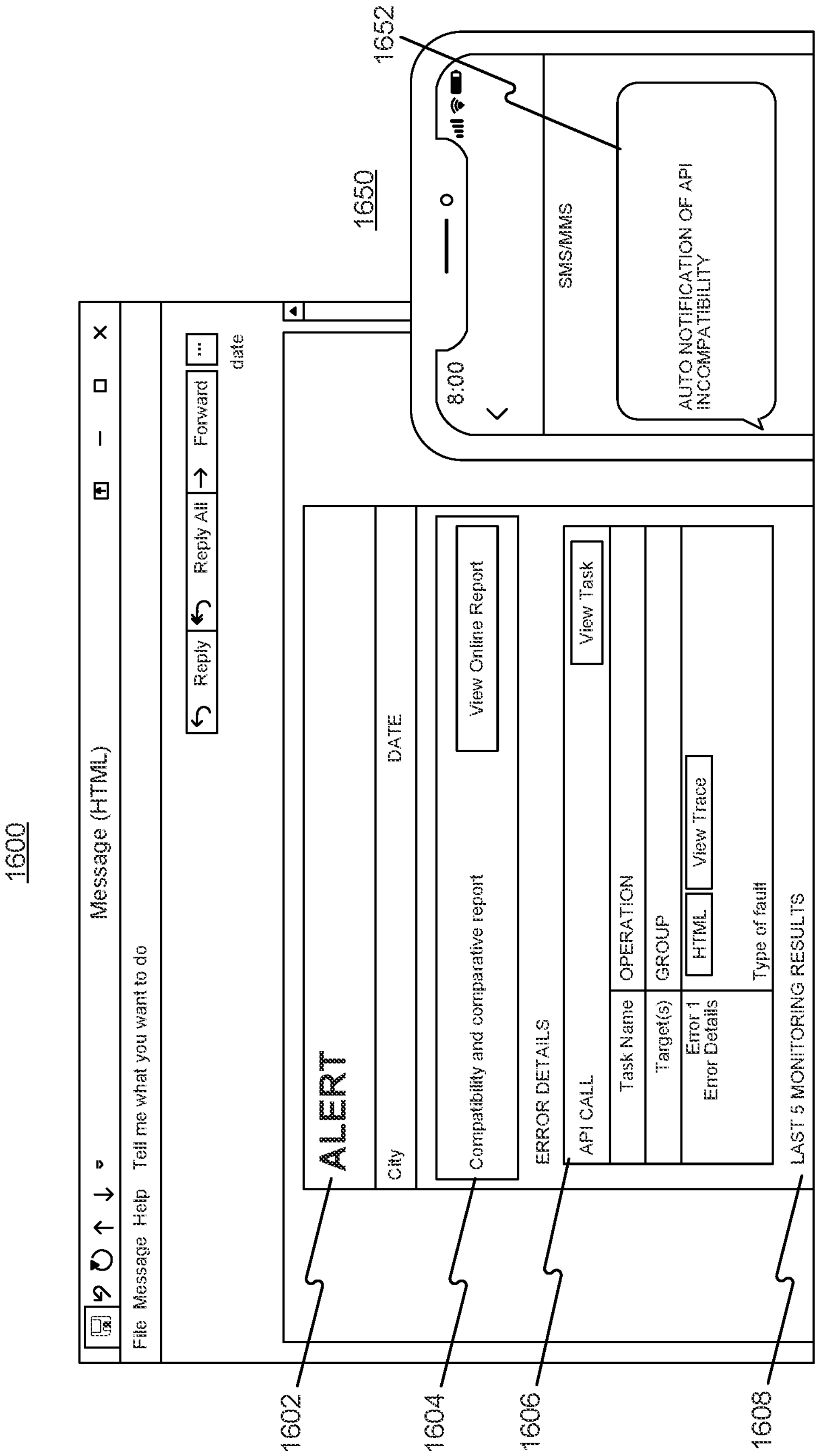
FIG. 16 displays exemplary graphical user interfaces of alerts and/or notifications generated during an API evaluation, consistent with disclosed embodiments.

FIG. 16 displays exemplary graphical user interfaces (GUIs) of alerts and/or notifications generated during an API evaluation, consistent with disclosed embodiments. FIG. 16 shows exemplary alters for desktop GUI 1600 and a mobile GUI 1650. As further described in connection with FIG. 12, API manager 320 may generate desktop GUI 1600 and/or mobile GUI 1650 as part of process 1200 and communicate it through administrator network 670.

Desktop GUI 1600 may include a title 1602 specifying the type of notice, a report section 1604, and an error details panel 1606 which may include more specific information about API calls that are incompatible and/or metrics that are underperforming. Further, desktop GUI 1600 may include a results link 1608 to view additional results of compatibility and comparative reports.

Mobile GUI 1650 may include a message 1652 with specific information about compatibility errors or comparative results of the bucket or split-run testing between legacy APIs and Updated APIs.

Another aspect of the disclosure is directed to a non transitory computer readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps, and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps, and/or inserting or deleting steps.

What is claimed is:

1. A system comprising:

one or more processors; and one or more memory devices storing instructions that, when executed by the one or more processors, configure the one or more processors to:

assign a legacy API for communications with a first group of accounts;

assign an updated API for communications with a second group of accounts, the second group having different members than the first group;

collect communications from the first and the second groups of accounts during a time interval;

generate a comparative report comparing communication metrics associated with the first group and the second group;

determine a recommendation based on the comparative report; and based on the recommendation, automatically migrate one or more accounts to the updated API.

2. The system of claim 1, wherein the first and the second groups of accounts are divided based on one or more group segmentation rules.

3. The system of claim 1, wherein the communications include bidirectional communications to and from the first and the second groups of accounts.

4. The system of claim 1, wherein the comparative report specifies mismatches between communications from the first group and a difference between the communication metrics associated with the first and the second groups of accounts.

5. The system of claim 1, wherein the comparative report comprises one or more comparative scores, wherein the comparative scores are positive when the communication metrics associated with the first group of accounts is poorer than the communication metrics associated with the second group of accounts.

6. The system of claim 5, wherein the one or more processors are configured to automatically migrate the one or more accounts when the one or more comparative scores are above a threshold.

7. The system of claim 1, wherein the recommendation comprises an updated mapping table specifying how the first and the second groups of accounts should be assigned based on the comparative report.

8. The system of claim 1, wherein automatically migrating the one or more accounts comprises substituting functions of the legacy API with functions of the updated API.

9. The system of claim 8, wherein substituting the functions comprises establishing equivalences between the functions of the legacy API with the functions of the updated API.

10. The system of claim 1, wherein automatically migrating the one or more accounts comprises applying one or more conversion functions to convert communications in a legacy API format to an updated API format.

11. A method comprising:

assigning a legacy API for communications with a first group of accounts;

assigning an updated API for communications with a second group of accounts, the second group having different members than the first group;

collecting communications from the first and the second groups of accounts during a time interval;

generating a comparative report comparing communication metrics associated with the first group and the second group;

determining a recommendation based on the comparative report; and based on the recommendation, automatically migrating one or more accounts to the updated API.

12. The method of claim 11, wherein the first and the second groups of accounts are divided based on one or more group segmentation rules.

13. The method of claim 11, wherein the comparative report specifies mismatches between communications from the first group and a difference between the communication metrics associated with the first and the second groups of accounts.

14. The method of claim 11, wherein the comparative report comprises one or more comparative scores, wherein the comparative scores are positive when the communication metrics associated with the first group of accounts is poorer than the communication metrics associated with the second group of accounts.

15. The method of claim 14, wherein automatically migrating the one or more accounts is performed when the one or more comparative scores are above a threshold.

16. The method of claim 11, wherein the recommendation comprises an updated mapping table specifying how the first and the second groups of accounts should be assigned based on the comparative report.

17. The method of claim 11, wherein automatically migrating the one or more accounts comprises substituting functions of the legacy API with functions of the updated API.

18. The method of claim 17, wherein substituting the functions comprises establishing equivalences between the functions of the legacy API with the functions of the updated API.

19. The method of claim 11, wherein automatically migrating the one or more accounts comprises applying one or more conversion functions to convert communications in a legacy API format to an updated API format.

20. A system comprising:

one or more processors; and one or more memory devices storing instructions that, when executed by the one or more processors, configure the one or more processors to:

assign a first API for communications with a first group of accounts;

assign an second API for communications with a second group of accounts, the second group having different members than the first group;

generate a comparative report comparing communication metrics associated with the first group and the second group of accounts based on communications to and from the first and the second groups of accounts, wherein the communication metrics indicate an assessment of performance between the first API and the second API;

determine a recommendation based on the comparative report; and based on the recommendation, automatically migrate the first group of accounts to the second API or the second group of accounts to the first API.

* * * * *